US011409507B1

(12) United States Patent
Shepherd

(10) Patent No.: US 11,409,507 B1
(45) Date of Patent: Aug. 9, 2022

(54) DEPENDENCY MANAGEMENT IN SOFTWARE DEVELOPMENT

(71) Applicant: State Farm Mutual Automobile Insurance Company, Bloomington, IL (US)

(72) Inventor: Nate Shepherd, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/025,460

(22) Filed: Sep. 18, 2020

Related U.S. Application Data

(60) Provisional application No. 62/902,323, filed on Sep. 18, 2019.

(51) Int. Cl.
*G06F 9/44* (2018.01)
*G06F 8/41* (2018.01)
*G06F 8/75* (2018.01)
*G06F 8/10* (2018.01)

(52) U.S. Cl.
CPC ................ *G06F 8/433* (2013.01); *G06F 8/10* (2013.01); *G06F 8/75* (2013.01)

(58) Field of Classification Search
CPC .................................................. G06Q 10/06
USPC .......................................... 707/101; 717/120
See application file for complete search history.

(56) References Cited

U.S. PATENT DOCUMENTS

| | | | |
|---|---|---|---|
| 8,370,803 B1 * | 2/2013 | Holler ....................... | G06F 8/36 717/107 |
| 8,813,040 B2 * | 8/2014 | Holler ................. | G06F 11/3684 717/131 |
| 10,049,337 B2 * | 8/2018 | Mack ................... | G06Q 10/067 |
| 10,083,412 B2 * | 9/2018 | Suntinger ......... | G06Q 10/06314 |
| 10,248,387 B2 * | 4/2019 | Bharthulwar ........ | G06Q 10/103 |
| 10,372,421 B2 * | 8/2019 | Mack ........................ | G06F 8/20 |

(Continued)

FOREIGN PATENT DOCUMENTS

WO WO-2017001417 A1 * 1/2017 .......... G06F 11/3608

OTHER PUBLICATIONS

Sonja Dimitrijevic et al. "A comparative study of software tools for user story management"; Information and Software Technology 57 (2015) 352-368.*

(Continued)

*Primary Examiner* — Francisco J Aponte
(74) *Attorney, Agent, or Firm* — Lee & Hayes, P.C.

(57) ABSTRACT

A software project management system can store object data about components of a software development project, such epics, features, and stories. The software project management system can also store dependency objects that reflect dependency relationships between two or more components of the software development project. The dependency objects can track status information about the dependency relationships, including expected completion dates, acceptance criteria, and state indicators. The information stored in the dependency objects can be updated over time as information about the dependency relationship changes. The software project management system can also use the dependency objects to display information in a user interface about one or more dependency relationships, such as to indicate which dependency relationships are on track or behind schedule.

20 Claims, 17 Drawing Sheets

(56) References Cited

U.S. PATENT DOCUMENTS

| | | | |
|---|---|---|---|
| 10,452,521 B2 * | 10/2019 | Kaulgud | G06F 8/70 |
| 10,540,573 B1 * | 1/2020 | Li | G06K 9/6261 |
| 11,093,227 B1 * | 8/2021 | Shteyman | H04L 67/34 |
| 2014/0359555 A1 * | 12/2014 | Holler | G06Q 10/101 |
| | | | 717/101 |
| 2015/0234801 A1 * | 8/2015 | Michaels | G06F 3/04842 |
| | | | 715/733 |
| 2017/0061348 A1 * | 3/2017 | Mack | G06Q 10/06313 |
| 2018/0068271 A1 * | 3/2018 | Abebe | G06Q 10/103 |
| 2018/0075412 A1 * | 3/2018 | Mandava | G06Q 10/101 |
| 2018/0365628 A1 * | 12/2018 | Bhaskaran | G06Q 10/063112 |
| 2019/0050771 A1 * | 2/2019 | Meharwade | G06N 20/00 |
| 2020/0159525 A1 * | 5/2020 | Bhalla | G06F 21/563 |
| 2020/0159950 A1 * | 5/2020 | Bodin | G06F 21/31 |
| 2020/0210934 A1 * | 7/2020 | Bar-on | G06F 8/20 |
| 2022/0006706 A1 * | 1/2022 | Patodia | H04L 41/5009 |

OTHER PUBLICATIONS

Alexandra Mihalache; "Project Management Tools for Agile Teams"; Faculty of Cybernetics, Statistics and Economic Informatics Bucharest University of Economic Studies, Romania—Informatica Economică vol. 21, No. Apr. 2017.*

Sebastian Gayer, et al. "Computing Practices—Lightweight Traceability for the Agile Architect" Computer Society IEEE—2016.*

Radek Silhavy et al. "Cybernetics Approaches in Intelligent Systems"; Advances in Intelligent Systems and Computing 661—Computational Methods in Systems and Software 2017, vol. 1.*

\* cited by examiner

700

| PROJECT | PORTFOLIO PLANNER | PRODUCT | PI / RELEASE | TEAM |

Project Path: Mod -> External Dependencies

PORTFOLIO ITEMS    FILTER: *Click or Start Typing*

◄◄ ◄  1-50 of 205  ►►

| Title | ID | Owners | Progress | Status | Date Created | Date Complete | Planned End |
|---|---|---|---|---|---|---|---|
| Dependency A | E-50718 | Bill J; Jim T. | 100% | DONE | 8/06/20 | 8/25/20 | 9/01/20 |
| Dependency B | E-50756 | Cody T; Sarah B | 100% | DONE | 8/10/20 | 9/07/20 | 9/14/20 |
| Dependency C | E-50786 | Amber Y; Joseph N. | 75% | IMPL... | 8/10/20 | -- | 9/14/20 |
| Dependency E | E-50878 | Jessica M. | 50% | IMPL... | 8/14/20 | -- | 9/30/20 |
| Dependency C | E-50914 | Sandeep R. | 15% | BACK... | 8/28/20 | -- | 10/02/20 |
| ... | ... | ... | ... | ... | ... | ... | ... |

FIG. 7

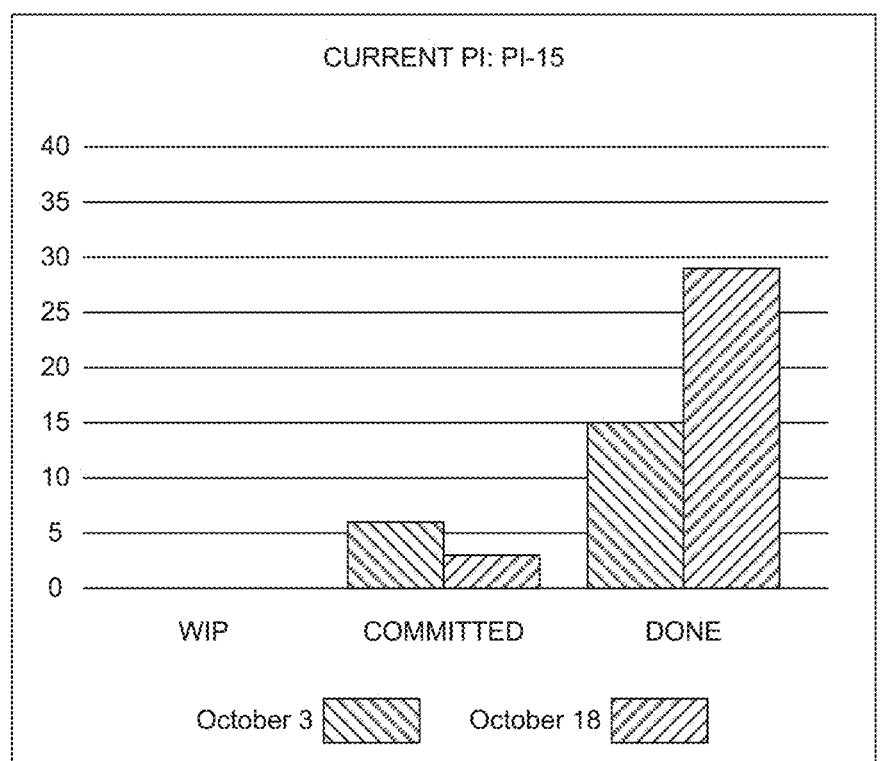
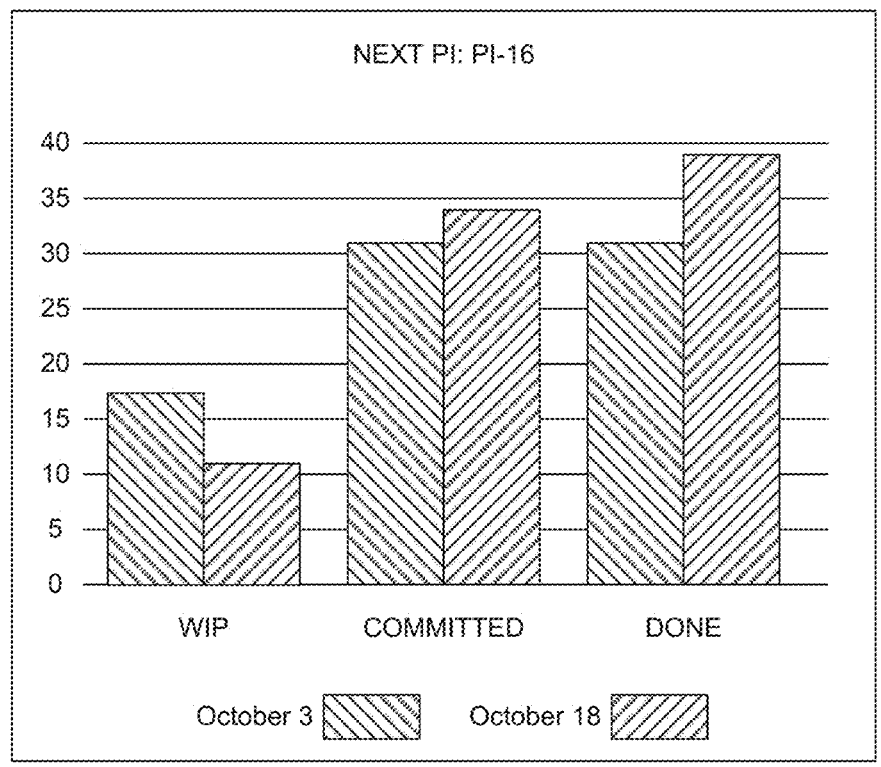
FIG. 12

| DEPENDENCY FLOW BY PI | Status | | | |
|---|---|---|---|---|
| PI/FLOW | Committed | Done | WIP | Total |
| PI-15 | 6 | 33 | 4 | 43 |
| Cross-Supplier | 1 | 2 | 0 | 3 |
| Downstream | 5 | 14 | 2 | 21 |
| Upstream | 0 | 17 | 2 | 19 |
| PI-16 | 8 | 4 | 25 | 37 |
| Cross-Supplier | 1 | 0 | 1 | 2 |
| Downstream | 0 | 0 | 15 | 15 |
| Upstream | 7 | 4 | 9 | 20 |
| PI-17 | 0 | 0 | 10 | 10 |
| ... | ... | ... | ... | ... |

1400

| DEPENDENCY BY SUPPLIER | Status | | | |
|---|---|---|---|---|
| Supplier Name/Area | Committed | Done | WIP | Total |
| Supplier A | 0 | 2 | 0 | 2 |
| Supplier B | 1 | 1 | 0 | 2 |
| Supplier C | 2 | 1 | 1 | 4 |
| Supplier D | 5 | 8 | 9 | 22 |
| ... | ... | ... | ... | ... |

DEPENDENCY MANAGEMENT IN SOFTWARE DEVELOPMENT

RELATED APPLICATIONS

This U.S. Patent Application claims priority to provisional U.S. Patent Application No. 62/902,323, entitled "Dependency Management in Agile Software Development," filed on Sep. 18, 2019, the entirety of which is incorporated herein by reference.

BACKGROUND

Software development projects can be developed according to different development methodologies, such as a waterfall development methodology or an agile development methodology. In the waterfall development methodology, developers may develop an entire software development project in full over a relatively long period of time. However, in many cases, the waterfall development methodology can lead to long periods of time going by before it becomes apparent that the software development project is not meeting its goals. Many developers thus prefer the agile development methodology, which prioritizes creating distinct and smaller components of a larger software development project on a more rapid schedule. For example, a software development project can be broken into smaller components, such as epics, features, and/or stories. Each of these smaller components can be developed individually on relatively short timeframes, such as during program increments (PIs) that may be measured in weeks. Accordingly, the agile development methodology may allow issues with any of the smaller components to be found and corrected relatively quickly.

In many cases, development of one component of a software development project, such as an epic, feature, or story, may depend on development of one or more other components of the software development project, or of a different software development project. For example, a front-end user interface for a billing system may utilize an Application Programming Interface (API) to interact with a back-end portion of the billing system. Development of the front-end user interface may depend on completion of development of the back-end portion of the system and/or the API. Accordingly, if a programmer is assigned to work on the front-end portion of the system, the programmer may be unable to develop the front-end portion if development of the back-end portion or the API has not yet been completed. Thus, for scheduling and planning purposes, it can be difficult to know when components of a project have been, or will be, completed, and to determine when development of other related components can begin.

Although some conventional software project management systems allow project managers and other users to track the development progress of individual components of a larger project, it can be difficult to track dependency relationships between related components of the project in such conventional software project management systems. Even if conventional software project management systems are able to indicate that development of a particular component is dependent on development of another component, conventional software project management systems often do not provide information about the status of the dependency relationship itself. This can make project planning and scheduling more difficult, as a user cannot easily determine when a component associated with a dependency is projected to be completed such that development of a related component can begin, the user cannot determine if programmers associated with dependencies are on schedule or behind schedule on development of their assigned components, and the user cannot otherwise track the status of dependencies associated with the software development project.

Additionally, in agile development practices, frequent prioritization and re-prioritization of work may occur, which can impact a dependent developer. Production defects, resource outages, and other occurrences may impact the ability to deliver a dependency on time. Conventional software project management systems may not adequately reflect or communicate these issues to all impacted developers. Conventional software project management systems also often struggle with the speed at which decisions associated with dependencies are made, and with evaluating impacts to subsequent dependencies and/or associated components. For example, a developer requiring a dependency may experience re-prioritization that would allow more time for development of the dependency to be completed by another party. In the agile development methodology, such changes in timing and expectations can occur rapidly and require instant feedback because of shortened durations. However, conventional software project management systems often fail to timely notify parties of such changes.

The example systems and methods described herein may be directed toward mitigating or overcoming one or more of the deficiencies described above.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 depicts a second example of information that can be displayed in the user interface, in which the information relates to multiple dependencies.

FIG. 12 depicts a seventh example of information that can be displayed in the user interface, in which the user interface displays progress charts associated with one or more time periods.

SUMMARY

Figure 1:
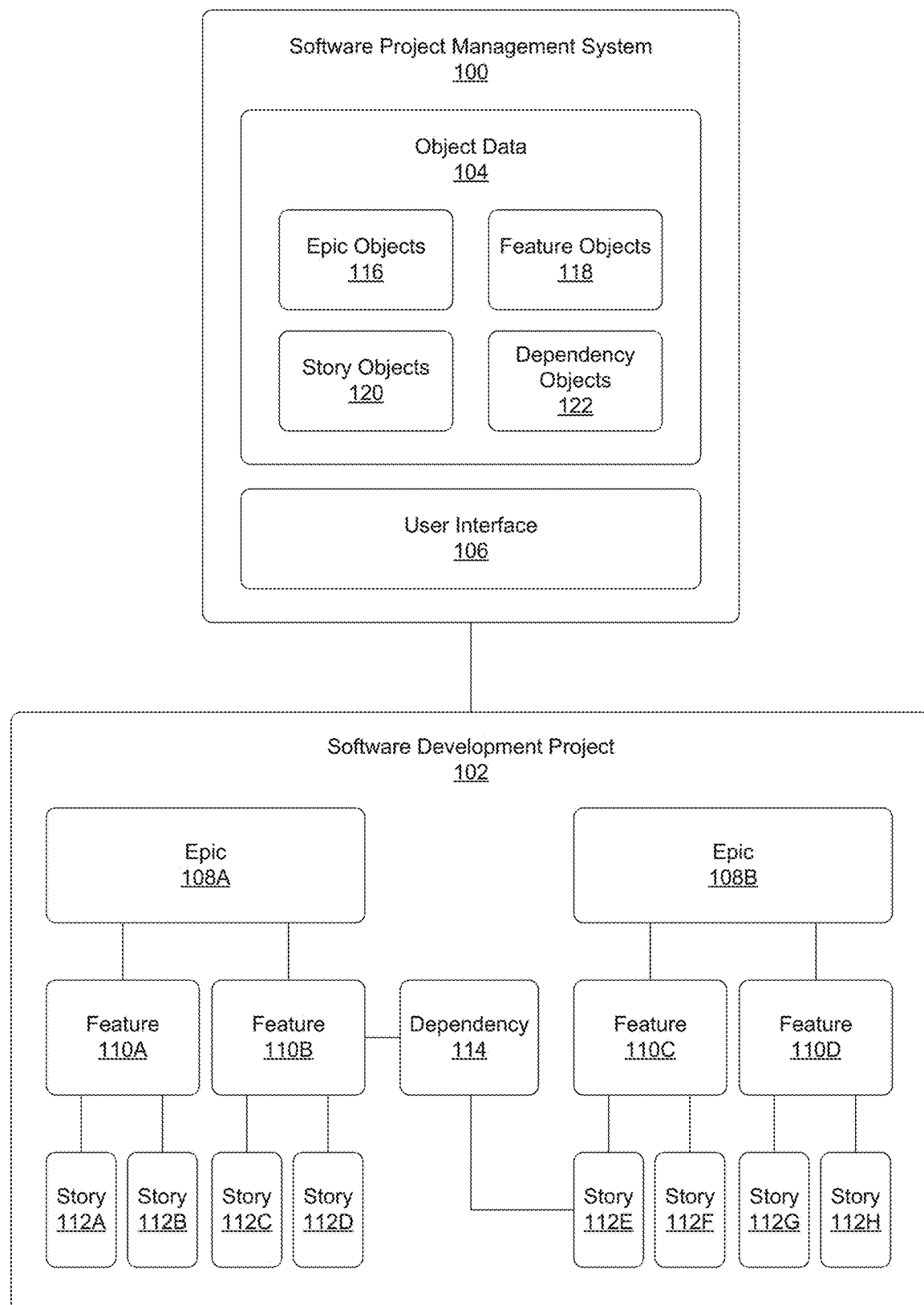
FIG. 1 shows an example of a software project management system that uses dependency objects to manage information associated with dependency relationships between different components of a software development project.

Described herein are systems and methods that a software project management system can use to track dependencies between components of a software development project. The software project management system can have data objects associated with components of the software development project, such as individual epics, features, and/or stories. The software project management system can also have separate data objects that are specifically associated with dependency relationships between two or more components of the software development project, such that the data objects for the dependency relationships can store status information and other information about the dependency relationships themselves. The software project management system can also have a user interface that allows users to view and/or edit information about the dependency relationships, based on the data objects associated with the dependency relationships.

According to a first aspect, a computer-implemented method can include creating, in memory, a dependency object that represents a dependency relationship associated with a software development project. The dependency object can include a state indicator that identifies a state of the dependency relationship, at least two component identifiers that identify at least two components of the software development project, separate from the dependency object, that are associated with the dependency relationship, and one or more dates associated with the dependency relationship. The method can further include receiving new information associated with the dependency relationship and updating the dependency object based on the new information. The method can additionally include displaying, in a user interface and based on the dependency object, information associated with the dependency relationship.

According to a second aspect, a computing device can include one or more processors and memory storing computer-executable instructions that, when executed by the one or more processors, cause the computing system to perform operations. The operations can include creating, in the memory, a dependency object that represents a dependency relationship associated with a software development project. The dependency object can include a state indicator that identifies a state of the dependency relationship, at least two component identifiers that identify at least two components of the software development project, separate from the dependency object, that are associated with the dependency relationship, and one or more dates associated with the dependency relationship. The operations can further include receiving new information associated with the dependency relationship and updating the dependency object based on the new information. The operations can additionally include displaying, in a user interface and based on the dependency object, information associated with the dependency relationship.

According to a third aspect, one or more non-transitory computer-readable media can store computer-executable instructions that, when executed by one or more processors, cause the one or more processors to perform operations. The operations can include creating, in memory, a dependency object that represents a dependency relationship associated with a software development project. The dependency object can include a state indicator that identifies a state of the dependency relationship, at least two component identifiers that identify at least two components of the software development project, separate from the dependency object, that are associated with the dependency relationship, and one or more dates associated with the dependency relationship. The operations can further include receiving new information associated with the dependency relationship and updating the dependency object based on the new information. The operations can additionally include displaying, in a user interface and based on the dependency object, information associated with the dependency relationship.

DETAILED DESCRIPTION

FIG. 1 shows an example of a software project management system 100 that manages information associated with a software development project 102. The software project management system 100 can be used during development of the software development project 102 to track status information and other information about components of the software development project 102, and/or other software development projects. For example, the software project management system 100 can store object data 104 associated with one or more components of the software development project 102 and/or other software development projects. The software project management system 100 may also have a user interface 106 that permits users to view and edit data associated with the object data 104, as will be discussed further below. As a non-limiting example, the software project management system 100 may be an application known as VersionOne® that is configured to track software development according to an agile development methodology. However, the systems and methods described herein can also be used with respect to other types of software project management systems other than VersionOne®. An example architecture for a computing device that can execute the software project management system 100 described herein is shown and described below with respect to FIG. 15.

The software development project 102 can be divided into a set of components that can be developed separately. Individual components of the software development project 102 may be further divided into subcomponents that can also be developed separately. For example, when the software development project 102 is being developed according to an agile development methodology, the overall software development project 102 can be broken up into smaller components including epics, features, and stories.

Epics can be high-level concepts associated with the software development project 102. For example, as shown in FIG. 1, different high-level concepts in the software development project 102 can be represented using epic 108A, epic 108B, and/or other epics.

As an epic is developed, the epic can be broken down into a set of features, which may be more specific and/or narrower in scope than the epic. For example, the high-level concept represented with epic 108A can be divided into a set of smaller concepts represented with feature 110A, feature 110B, and/or other features. Epic 108B can similarly be divided into feature 110C, feature 110D, and/or other features.

A feature can similarly in turn be broken down into a set of stories, which can be more specific and/or narrower in scope than the feature. For example, feature 110A may be divided into story 112A, story 112B, and/or other stories. In some cases, different stories associated with a feature may represent different uses cases for a how a user may use that feature.

In some examples, a programmer or team of programmers can focus on developing and delivering an executable version of a particular story over a particular PI, such as a period of weeks. The programmer or team can then move on to working on development of another story during the next PI. Accordingly, the programmer or team can focus on developing executable versions of individual stories during different PIs measured in weeks, rather than attempting to implement an entire feature, an entire epic, or the entire software development project 102 as a whole over a longer development period.

In some cases, development of a component of the software development project 102 may depend on development or one or more other components of the software development project 102, and/or one or more components of other software development projects. For instance, if feature 110B is expected to interact with story 112E, a programmer or team may not be able to develop feature 110B until another programmer or team completes development of story 112E. As a non-limiting example, feature 110B may be a front-end element that is expected to interact with a particular back-end element being developed in association with story 112E. In this example, a first team assigned to develop feature 110B may not be able to complete, or potentially even begin, development of feature 110B until a second team has finished development of story 112E.

Such relationships between components of the software development project 102, or even between components of different software development projects, can be referred to as dependencies. In some examples, a dependency can represent a contractual relationship, or other agreement or promise, where one programmer or team has promised to deliver a component needed by another programmer or team. A dependency can be considered to be a downstream dependency from the point of view of the programmer or team who is implementing a component that another programmer or team is waiting for. Similarly, a dependency can be considered to be an upstream dependency from the point of view of the programmer or team who is waiting for another component from another programmer or team. In some examples, components being developed by two different suppliers may at least partially depend on each other, such that a dependency relationship between them may be considered to be a cross-supplier dependency relationship.

FIG. 1 depicts an example dependency 114 that relates feature 1110B to story 112E. In some examples, dependency 114 may indicate that development of feature 110B depends on development of story 112E. However, in other examples, dependency 114 may indicate that development of story 112E depends on development of feature 110B. As will be described further below, object data 104 associated with the dependency 114 can indicate the nature of the dependency relationship, such as identifying whether development of feature 110B depends on story 112E, or whether development of story 112E depends on feature 110B.

Dependencies may relate an epic to an epic, an epic to a feature, an epic to a story, a feature to a feature, a feature to a story, a story to a story, or any other dependency relationship between components of the software development project and/or other software development projects. In some examples, a dependency may also, or alternately, relate to one or more other dependencies associated with the software development project and/or other software development projects. For example, a particular dependency may indicate a dependency relationship between two other dependencies.

In some examples, a dependency may indicate a dependent relationship between two components. However, in other examples, a dependency may indicate a dependent relationship between a component and more than one other component, as will be discussed further below. For instance, a dependency may indicate that development of a particular feature depends on the development of two other features.

The software project management system 100 can use object data 104 to track the development of components such as epics, features, and stories, as well as to track the status of one or more dependencies between such components. For example, as shown in FIG. 1, the software project management system 100 can generate and maintain object data 104 in a database or other memory location. The object data 104 can include data objects that are associated with individual components of the software development project 102, and/or other software development projects. The object data 104 can also include data objects that are associated with dependencies between such components. The data objects in the object data 104 can be database entries, files, or information stored in other data formats that indicate information about corresponding components or dependencies.

For example, the software project management system 100 can generate and maintain object data 104 including epic objects 116, feature objects 118, and/or story objects 120. The object data 104 can include an epic object for each epic in the software development project 102, a feature object for each feature in the software development project 102, and a story object for each story in the software development project 102.

The epic objects 116, feature objects 118, and story objects 120 can be data objects that indicate information associated with corresponding epics, features, and stories. For example, the epic objects 116, feature objects 118, and story objects 120 can be data objects that contain information indicating which team or programmer is assigned to work on the corresponding components, status information about development progress associated with the corresponding components, and/or other information about the corresponding components.

The software project management system 100 can also generate and maintain one or more dependency objects 122 in the object data 104. The dependency objects 122 can be associated with dependency relationships between two or more components, such as the relationship indicated by the dependency 114 shown in FIG. 1. A dependency object can include status information and other data associated with a corresponding dependency relationship, as discussed further below with respect to FIG. 4. Dependency objects 122 can represent upstream dependencies, downstream dependencies, or cross-supplier dependencies between components, including one-to-one relationship between components, one-to-many relationships between components, and many-to-many relationships between components.

The dependency objects 122 maintained by the software project management system 100 can be distinct from the epic objects 116, the feature objects 118, and the story objects 120 maintained by the software project management system 100. For example, while the software project management system 100 may use two epic objects 116 to separately track the development status of epic 108A and epic 108B, the software project management system 100 can use a distinct dependency object to separately track status information about a dependency relationship between epic 108A and epic 108B and/or sub-components of those epics. The distinct dependency object may allow the software project management system 100 to maintain and change information about the dependency object and the associated dependency, including information that may not be reflected in epic objects 116 for either epic 108A or epic 108B, or in associated feature objects 118 and/or story objects 120.

In some examples, a change in the state of a dependency object may trigger one or more actions within the software project management system 100. For example, if a target completion date associated with a particular dependency relationship is changed, the target completion date can be changed within a corresponding dependency object. The software project management system 100 can be configured to, based on a change in the target completion date in the dependency object, automatically send a notification or prompt a user to manually send a notification. For instance, the change in the target completion date in the dependency object can prompt an automatic or manual notification the change to be sent to one or more users associated with the dependency relationship, such as developers assigned to supply and/or receive components associated with the dependency relationship.

As another example, the software project management system 100 can use dependency objects 122 to manage complex interactions between different dependencies, which may be recursive in nature. For instance, a particular dependency, represented by a first dependency object, may be configured to execute or go into effect in the software project management system 100 if another dependency meets a target completion or execution date represented by a second dependency object.

A dependency relationship associated with a particular dependency object may change over time as development of the software development project 102 progresses, for instance when an epic associated with the dependency object is divided into features or when a feature associated with the dependency object is divided into stories. For example, FIGS. 2A-2E show an example 200 of changes in a dependency 202 over time during development of the software development project 102. The software development project 102 may ultimately develop into the epics, features, and stories shown in FIG. 1. As components are developed into such sub-components, the relationship associated with the dependency 202 can change, and a corresponding dependency object 204 may be updated as the dependency relationship changes. Alternatively, in some examples or situations, a new dependency object can be created to reflect the changed dependency relationship. For instance, in some examples, the software project management system 100 can be configured to use one dependency object to track a dependency as it develops at high levels, such as epic-to-epic, epic-to-feature, feature-to-feature, or feature-to-story, but use separate dependency objects to track story-to-story dependencies. However, in other examples, the same dependency object can be used to track a dependency at any level, from epic-to-epic down to story-to-story.

Figure 2A:
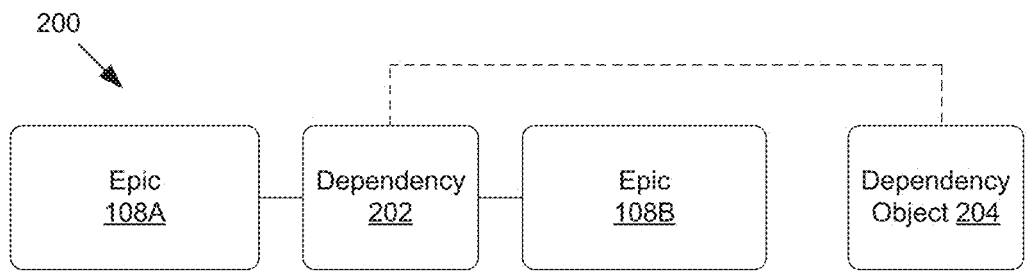
FIGS. 2A-2E show an example of changes in a dependency over time during development of the software development project.

FIG. 2A shows the dependency 202 at a first point in time, at which the dependency 202 expresses a dependent relationship between epic 108A and epic 108B. At the first point in time, epic 108A and epic 108B may not yet have been developed into narrower features or stories. For instance, epic 108A may be a high-level representation of a front-end system, and epic 108B may be a high-level representation of a back-end system that will interact with the front-end system, but the details of the front-end system and the back-end system have not yet been decided upon. However, a project manager or other user may expect that, at some level, portions of epic 108A may ultimately interact with or depend on portions of epic 108B. Accordingly, dependency 202 can be created to relate epic 108A with epic 108B. The software project management system 100 may generate epic objects to track epic 108A and epic 108B, and also generate the dependency object 204 that indicates the dependency relationship between epic 108A and epic 108B.

Figure 2B:
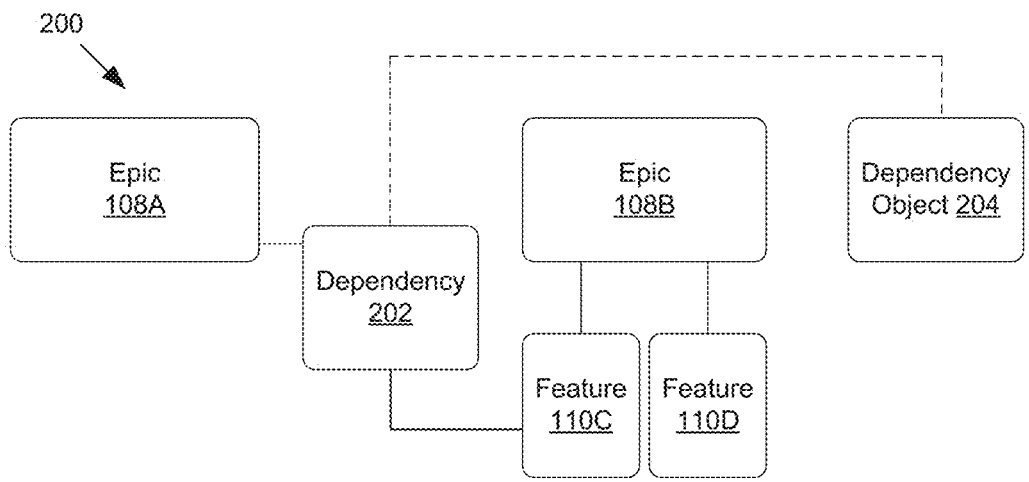

FIG. 2B shows the dependency 202 at a second point in time. At the second point in time, epic 108B may have been developed enough to divide epic 108B into features 110C and 110D. For instance, if the epic 108B represents a back-end system, feature 110C may represent an API used to exchange data with the back-end system, while feature 110D may represent a database to store data in the back-end system. The software project management system 100 may generate feature objects to track feature 110C and feature 110D. At the second point in time, epic 108A may still represent a front-end system generally. However, a user of the software project management system 100 may expect that the front-end system will use the API associated with feature 110C to interact with the back-end system. Accordingly, the dependency 202 can be updated as shown at FIG. 2B to indicate that epic 108A is dependent on development of feature 110C. The software project management system 100 may also update the dependency object 204 associated with dependency 202 to indicate that epic 108A depends on feature 110C.

Figure 2C:
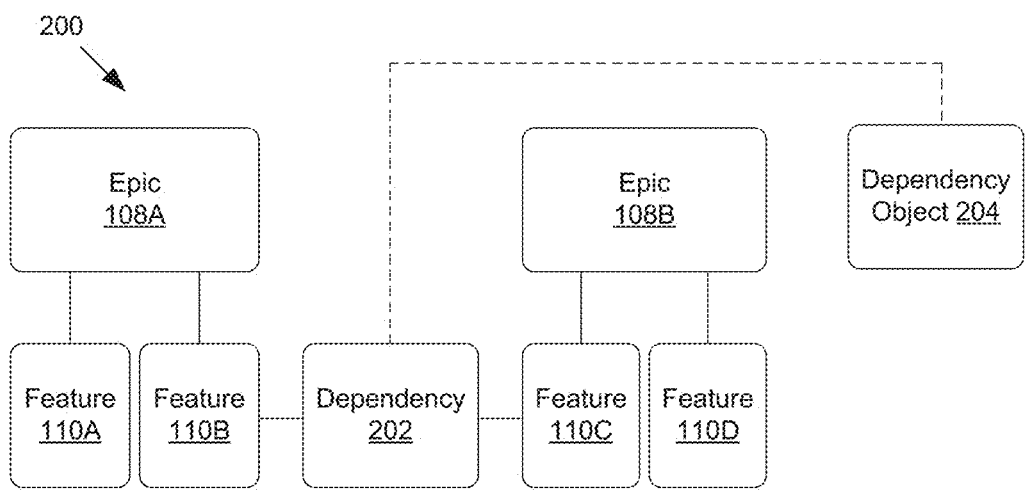

FIG. 2C shows the dependency 202 at a third point in time. At the third point in time, epic 108A may have been developed into feature 110A and feature 110B. For instance, if epic 108A represents a front-end system as discussed above, features 110A and feature 110B may represent specific components of the front-end system, such as different user interfaces. The software project management system 100 may generate feature objects to track feature 110A and feature 110B. At the third point in time, a user of the software project management system 100 may expect that the specific front-end user interface represented by feature 110B may depend on using the back-end API associated with feature 110C. Accordingly, the dependency 202 can be updated as shown at FIG. 2C to indicate that feature 110B is dependent on development of feature 110C. The software project management system 100 may also update the dependency object 204 associated with dependency 202 to indicate that feature 110B depends on feature 110C.

Figure 2D:
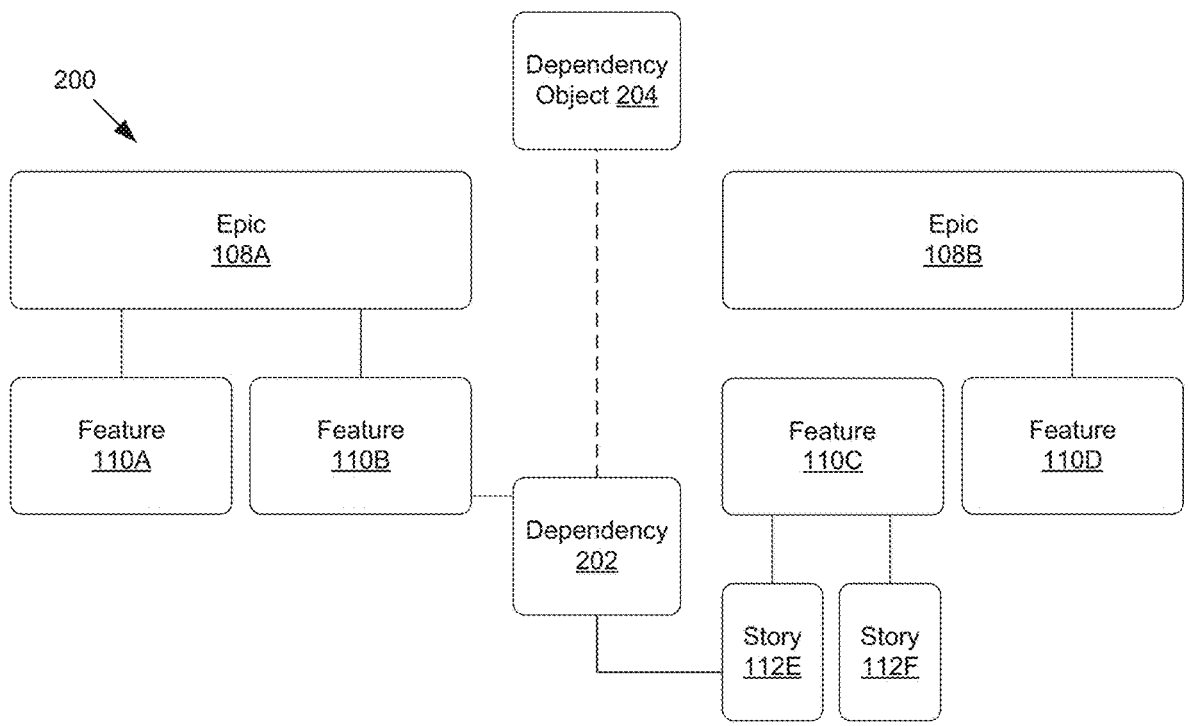

FIG. 2D shows the dependency 202 at a fourth point in time. At the fourth point in time, feature 110C may have been developed into story 112E and story 112F. For instance, if feature 110C represents a back-end API as discussed above, story 112E may represent a first use case in which the API is used to retrieve data from the back-end system, while story 112F represents a second use case in which the API is used to submit data to the back-end system. The software project management system 100 may generate story objects to track story 112E and story 112F. At the fourth point in time, a user of the software project management system 100 may expect that the specific front-end user interface represented by feature 110B may depend at least upon on using the data retrieval use case of the API represented by story 112E. Accordingly, the dependency 202 can be updated as shown at FIG. 2D to indicate that feature 110B is dependent on development of story 112E. The software project management system 100 may also update the dependency object 204 associated with dependency 202 to indicate that feature 110B depends on story 112E. In some examples, the dependency object 204 may be updated to indicate that feature 110B depends on both story 112E and story 112F, for instance if the specific front-end user interface represented by feature 110B may enable both the retrieval and submission uses cases of the API represented by story 112E and story 112F.

Figure 2E:
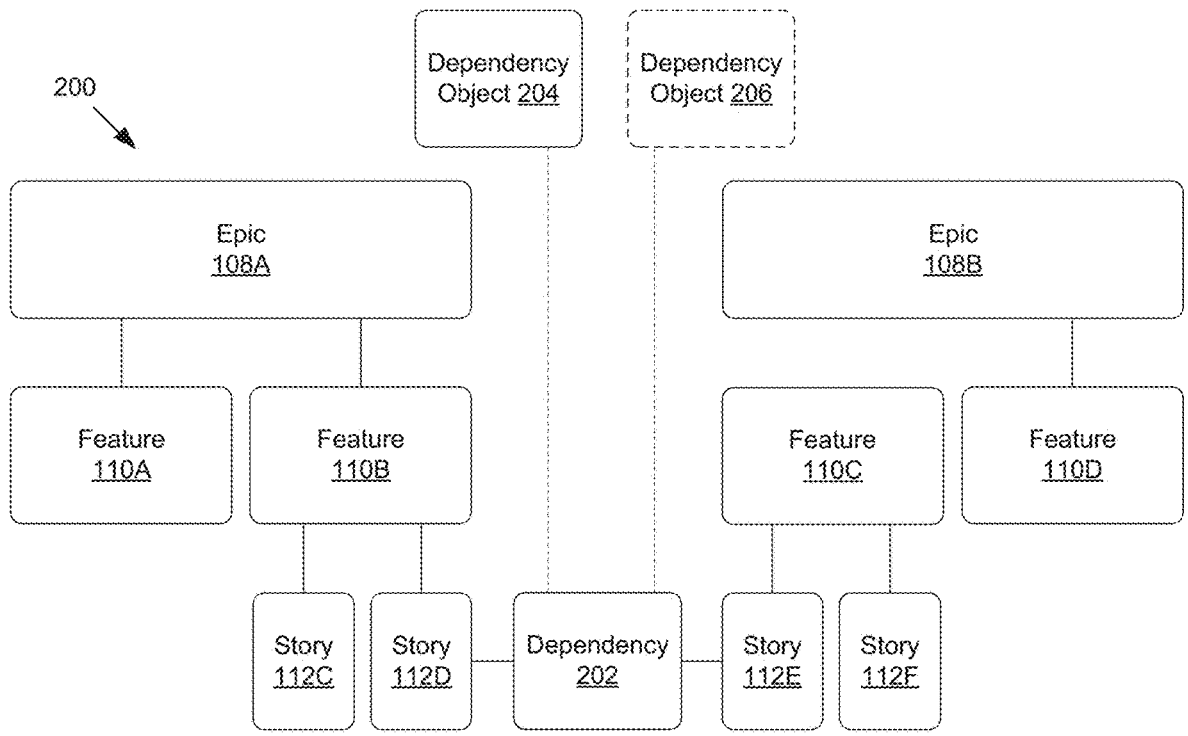

FIG. 2E shows the dependency 202 at a fifth point in time. At the fifth point in time, feature 110B may have been developed into story 112C and story 112D, such as narrower use cases for the front-end user interface represented by feature 110B. The software project management system 100 may generate story objects to track story 112C and story 112C. At the fifth point in time, a user of the software project management system 100 may expect that implementation of a specific use case of the front-end user interface represented by story 112D may depend at least upon on using the data retrieval use case of the API represented by story 112E. Accordingly, in some examples, the dependency 202 can be updated as shown at FIG. 2E to indicate that story 112D is dependent on development of story 112E.

In some examples, at the fifth point in time shown in FIG. 2E, the software project management system 100 may update the dependency object 204 associated with dependency 202 to indicate that story 112D depends on story 112E. However, in alternate examples, the software project management system 100 may instead generate a second dependency object 206 that indicates that story 112D depends on story 112E, while separately maintaining the previously existing dependency object 204 to indicate that, at a higher level, feature 110B depends on story 112E.

Although FIGS. 2A-2E show an example evolution of a dependency relationship associated with a particular dependency object over time, the software project management system 100 may maintain other dependency objects associated with other dependency relationships between components. For example, at the point in time shown in FIG. 2D, the same or a different dependency object may represent a dependency relationship between epic 108A and story 112E and/or story 112F. Similarly, at the point in time shown in FIG. 2D, another dependency object may represent a dependency relationship between story 112D and epic 108B.

FIG. 1 and FIGS. 2A-2E show examples of dependencies that can represent one-to-one dependency relationships between components. However, in other examples dependencies can represent one-to-many dependency relationships, many-to-one dependency relationships, or many-to-many dependency relationships between components. For example, as noted above, a dependency object may represent a dependency relationship between a component and a set of stories.

Figure 3:
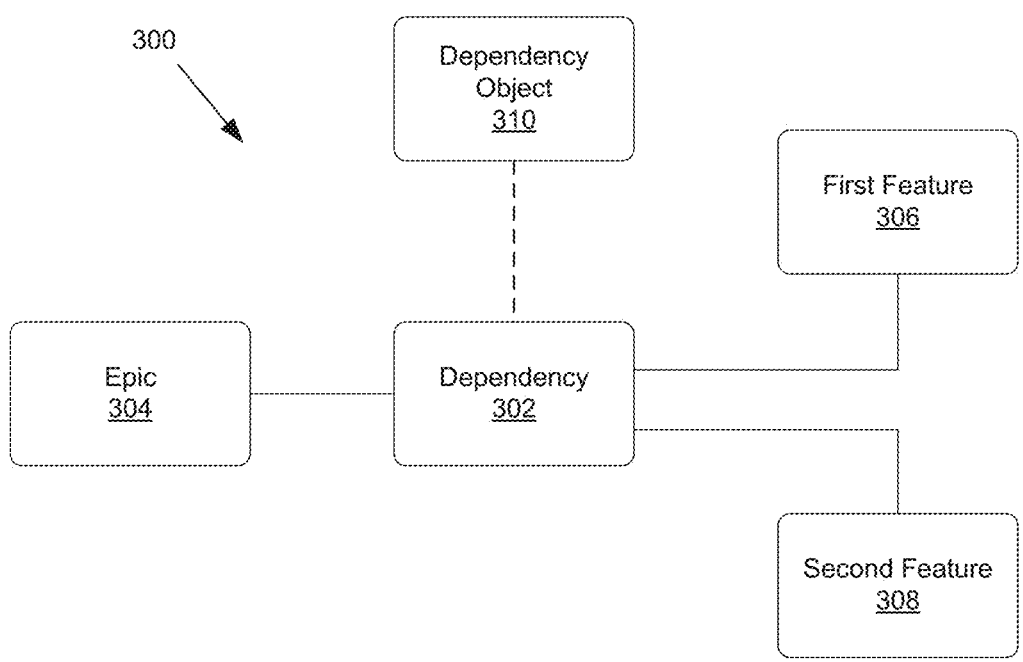
FIG. 3 shows an example in which a dependency object represents a dependency relationship between three components of the software development project.

As another example, FIG. 3 shows an example 300 in which dependency 302 represents a dependency relationship wherein development of an epic 304 depends on development of a first feature 306, and also on development of a second feature 308. In some examples, the first feature 306 and the second feature 308 may be part of the same epic, or being developed by the same or different teams associated with the same entity. However, in other examples, the first feature 306 and the second feature 308 may be components of different epics or even different software development projects that are being developed by different entities. For instance, the epic 304 and the first feature 306 may be part of the same software development project for a first product, but the second feature may be part of a different second software development project for a distinct second product. However, development of the epic 304 may depend on prior development of the first feature 306 of the same software development project as well as prior development of the second feature 308 of the separate second software development project.

In the example of FIG. 3, the software project management system 100 can maintain a dependency object 310 in the object data 104 that includes information about the dependency relationship between the epic 304, the first feature 306, and the second feature 308. As discussed above, the software project management system 100 can also update the dependency object 310 over time as the nature of the dependency 302 changes. For instance, if epic 304 develops into a set of features, the dependency object 310 associated with the dependency 302 can be updated in the software project management system 100 to indicate dependency relationships between one or more of the new features of epic 304 and the first feature 306 and/or the second feature 308.

Figure 4:
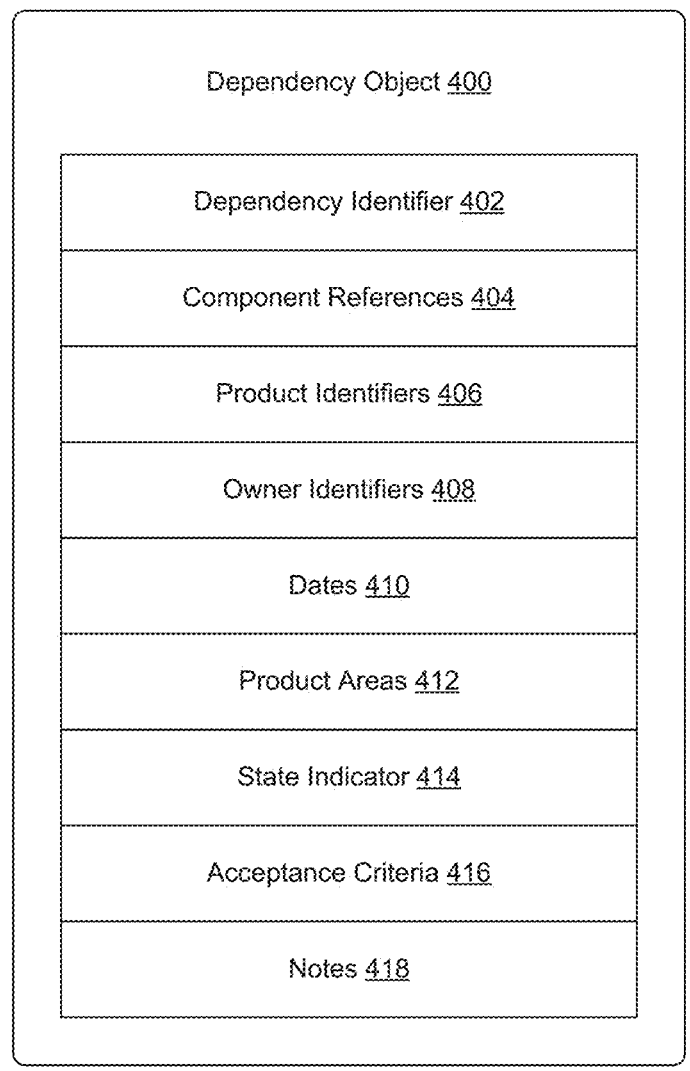
FIG. 4 depicts an example of data fields that can be contained in a dependency object.

FIG. 4 depicts an example of data fields that can be contained in a dependency object 400, such as one of the dependency objects 122. The dependency object 400 can be associated with a dependency relationship between two or more components of the software development project 102 and/or other software development projects. For example, the dependency object 400 can be associated with dependency 114, dependency 202, dependency 302, or another dependency relationship. The data fields of the dependency object 400 can include fields for one or more of: a dependency identifier 402, component references 404, product identifiers 406, owner identifiers 408, dates 410, product areas 412, a state indicator 414, acceptance criteria 416, notes 418, or any other type of data associated with the dependency object 400.

The dependency identifier 402 can be a unique identifier for the dependency object 400 and/or the corresponding dependency. For example, the dependency identifier 402 can include one or more of a number, a name, a description, or other identifiers of the dependency object 400 or corresponding dependency. In some examples, the software project management system 100 can store, track, and/or use different dependency objects 122 in the object data 104 based on the dependency identifiers associated with the dependency objects 122. For example, in some cases the user interface 106 of the software project management system 100 can display numbers, names, descriptions, or other identifiers associated with the dependency object 400 or corresponding dependency based on the dependency identifier 402 in the dependency object 400.

Component references 404 can identify components associated with the dependency relationship represented by the dependency object 400, and/or object data 104 associated with those components. For example, when development of a first feature by one team depends on development of a second feature having been completed by another team, the dependency object 400 can include component references 404 that identify the first feature and the second feature, and/or identify object data 104 associated with the first feature and the second feature. The component references 404 may also identify upstream, downstream, and/or cross-supplier dependency relationship data between the first feature and the second feature, for example to indicate that the first feature is a downstream component that is dependent on the second feature.

As the dependency develops over time, for example as shown above in FIGS. 2A-2E, the component references 404 can be updated. For example, if the dependency initially relates a first epic to a second epic, the component references 404 can initially identify the first epic and the second epic. However, if the first epic develops into a first feature and a second feature, and the second feature depends on the second epic, the component references 404 can be updated to indicate that the second feature now depends on the second epic.

Product identifiers 406 can identify one or more products associated with the dependency relationship represented by the dependency object 400. For example, software project management system 100 may manage software development projects for multiple products, and the product identifiers 406 can identify one or more specific products associated with the dependency relationship. Accordingly, the software project management system 100 may use the product identifiers 406 to filter or search for dependency objects associated with a particular product or particular software development project. Additionally, in some examples, development of one product may at some level depend on development of a different product. Other aspects of a product may also depend on development of another product. For example, press releases or automated communications associated with a product can be triggered based on completion of a dependency associated with another product. Similarly, a product implementation system may execute upon completion of a dependency associated with another product. Accordingly, similar to component references 404, the product identifiers 406 can indicate a product to product dependency relationship between identified products.

Owner identifiers 408 can indicate individuals and/or entities that are associated with the dependency relationship represented by the dependency object 400. The owner identifiers can identify owners of components associated with the dependency relationship. For example, when the dependency object 400 indicates that development of a story by a team of programmers is dependent on a feature being developed by an outside vendor, the owner identifiers 408 can identify the team of programmers assigned to develop the story associated with the dependency, and/or can identify the outside vendor responsible for development of the feature associated with the dependency.

As the dependency develops over time, for example as shown above in FIGS. 2A-2E, the owner identifiers 408 can be updated. For example, if the dependency is associated with a particular feature assigned to a team of programmers, but changes to be associated with a particular story within that feature who is assigned to a specific programmer, the owner identifiers 408 can be updated to identify that specific programmer instead of, or in addition to, the team of programmers.

In some examples, the owner identifiers 408 may also, or alternately, identify one or more individuals or entities who are responsible for managing and/or updating the dependency itself. For instance, the owner identifiers 408 may identify a project manager or other user who is responsible for approving the dependency as having met acceptance criteria 416, and/or any other personnel associated with the dependency.

Dates 410 can indicate creation dates, modification dates, target dates, start dates, expected or estimated completion dates, actual completion dates, and/or any other dates associated with the dependency. For example, the dates 410 can indicate when the dependency was created. As another example, the dates 410 can indicate when the when the dependency relationship was modified, for example to reflect new or modified acceptance criteria 416. As another example, the dates 410 can indicate when the when the dependency object 400 itself was updated or modified. As still further examples, the dates 410 can indicate when the dependency is projected to be completed, when the dependency is actually completed, or other scheduling data regarding the dependency For instance, the dates 410 can indicate that a downstream feature is expected to begin development on a first date and is targeted to be completed by a second date, such that the software development project can use such dates 410 to display reports in the user interface 106 regarding whether development associated with the feature is ahead of schedule, on schedule, or behind schedule.

Product areas 412 can indicate an organizational area associated with one or more entities associated with the dependency. For example, the owner identifiers 408 may use a team name to indicate that a feature or other component is being developed by a particular team. However, in some cases that team name may not indicate where the identified team is positioned within an organizational structure of a company or developer. The product areas 412 may therefore provide additional information about the team, such as by indicating that the team is within a billing or payment product area in a larger organization.

The state indicator 414 can indicate a current state of the dependency object 400, or the corresponding dependency. The state indicator 414 of the dependency object 400 can change to reflect different states as the dependency represented by the dependency object 400 changes over time. Examples of possible values for the state indicator 414 are described below with respect to FIG. 5.

The acceptance criteria 416 can be agreed-upon criteria for indicating when the dependency can be considered complete. For example, if product team may contract with an outside vendor to develop an API for a billing system. The product team and the outside vendor may agree on requirements for the API, such that the API should be able to be called to submit or retrieve data. These agreed-upon requirements can be indicated in the acceptance criteria 416 of the dependency object 400. In this example, once the outside vendor delivers a version of the API, the product team can evaluate the delivered API and determine if it meets the agreed-upon acceptance criteria 416. If it meets the acceptance criteria 416, the dependency can be completed.

Notes 418 can include any other type of data that can be manually or automatically entered in association with the dependency represented by the dependency object 400, and/or components related by the dependency. The notes 418 can include user-entered notes, documents, files, or any other type of data. As an example, the notes 418 can include an API architecture reference document. As another example, the notes 418 can include a data library for a database design.

The dependency object 400 can also use one or more of the data fields shown in FIG. 4, or other data fields, to store any other type of data associated with the dependency. For example, the dependency object 400 may store data including tags, progress indicators, project names, delay cost estimates, complexity estimates, identifiers of risks associated with the dependency, and/or other data.

As discussed above, a change in the state of a dependency object 400 may trigger other actions in the software project management system 100. For example, the software project management system 100 can be configured to perform an automated action, or prompt a user to take a manual action, upon a change to data in one or more data fields in the dependency object 400. In some examples, one or more fields of the dependency object 400 may indicate the type of action to be performed upon a change, and/or criteria for determining whether a change prompts the action.

As an example, the dependency object 400 may indicate that a first type of notification is to be sent to entities identified by the owner identifiers 408 if a target completion date in the dates 410 is changed at all, that a second type of notification is to be sent to the entities if the target completion date in the dates 410 is moved to an earlier date, or that a third type of notification is to be sent to the entities if the target completion date in the dates 410 is moved to a later date. As another example, the dependency object 400 may indicate that an update notification is to be sent to one or more parties when the state indicator 414 is changed, or when the when the state indicator 414 is changed to a certain value. As yet another example, the dependency object 400 may indicate that another dependency object for a different dependency relationship should be created or updated when the state indicator 414 is changed to a "close" state.

Other types of data objects in the object data 104, such as epic objects 116, feature objects 118, and story objects 120 may also have data fields that store information about corresponding components. For example, a feature object may have a unique identity, identify a team or programmer responsible for developing the feature, and/or include status information about the development state of the feature itself. However, although the software project management system 100 can store object data 104 specific to components such as epics, features, and stories, the separate dependency objects 122 can allow the software project management system 100 to additionally track and update data specific to individual dependency relationships between two or more of those components, as shown in FIG. 4.

Figure 5:
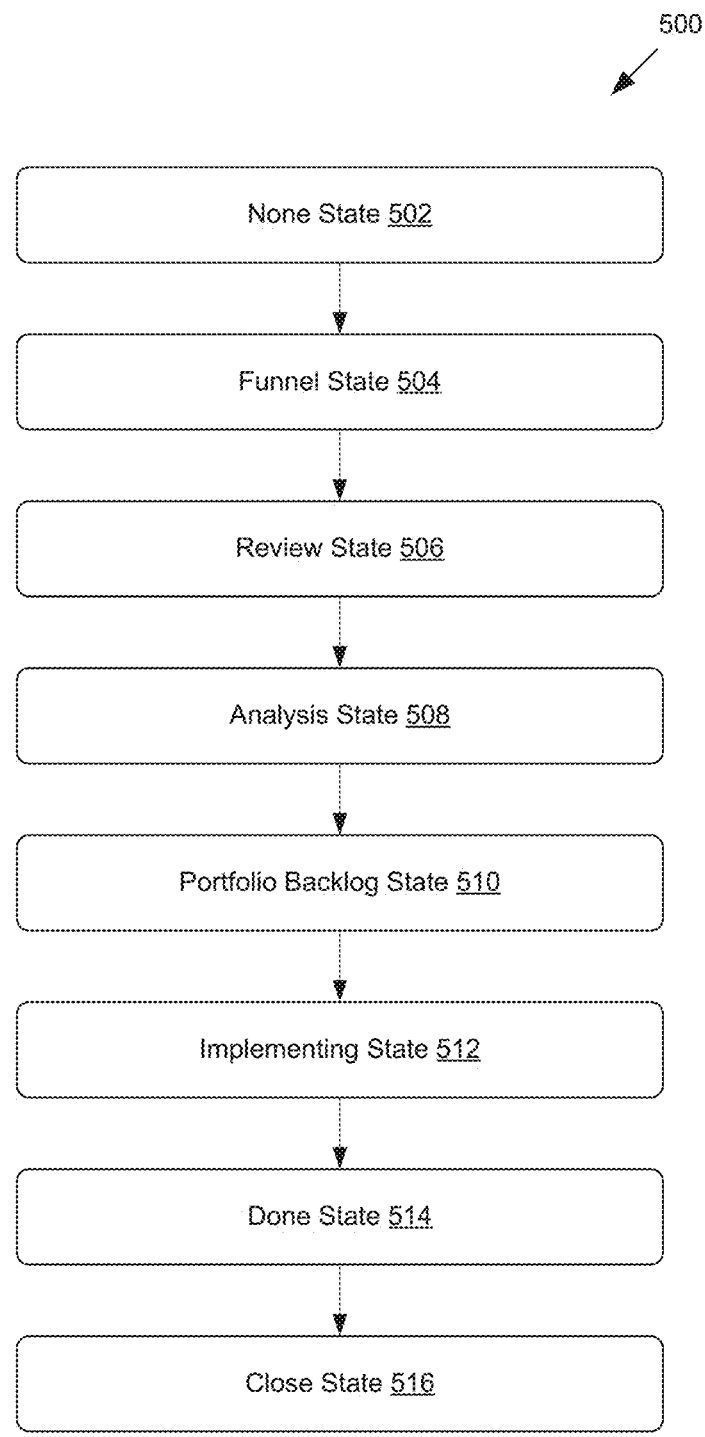
FIG. 5 depicts an example of a plurality of states that a dependency object can have.

FIG. 5 depicts an example 500 of a plurality of states that a dependency object can have. In some examples, a particular dependency object have multiple states during a lifetime of the associated dependency, such as a "none" state 502, a funnel state 504, a review state 506, an analysis state 508, a portfolio backlog state 510, an implementing state 512, a done state 514, a close state 516, and/or other states. As discussed above, a dependency object, such as dependency object 400, can have a state indicator 414 that identifies the current state of the dependency object, such as one of the states shown in FIG. 5. In some examples, a change of the current state of the dependency object can be a trigger that prompts the software project management system 100 to perform one or more other actions, such as sending a notification or prompting a user to send a manual notification.

The "none" state 502 can be a default initial state for the dependency object. For example, the "none" state 502 can indicate that a potential dependency relationship between two or more components has been identified, but that details are still being documented or worked out. For instance, the "none" state 502 may indicate that the dependency relationship is still conceptual in nature. In some examples, the dependency object can remain in the "none" state 502 until an epic or other component associated with dependency object is ready to be transitioned to a product management team.

The "funnel" state 504 can indicate that high-level details of a dependency relationship are being, or have been, added to the dependency object. For example, at this point a user may begin adding details to component references 404 of the dependency object to indicate which epics, features, or stories the dependency is aligned. As another example, the user may add dates 410 to the dependency object to indicate when one or more corresponding components are expected to be delivered. In some examples, the "funnel" state 504 can also indicate that the dependency object is ready for engagement with a supplier of a component associated with the dependency. In some examples, the dependency object may remain in the "funnel" state 504 until after such an initial engagement takes place.

The "review" state 506 can be a state during which dependency acceptance criteria 416, timelines, and/or other details are being negotiated with a supplier of a component associated with the dependency relationship. In some examples, the dependency object can remain in the "review" state 506 until such acceptance criteria 416 and timelines have been agreed to with the supplier, and/or the supplier has created a shell feature or other shell component to account for work associated with the dependency object.

The "analysis" state 508 can be a state during which grooming of components by a consumer entity and a provider entity is in progress, and both entities are connected to the corresponding dependency in the software project management system 100. In some examples, a dependency object can remain in the "analysis" state 508 until requirements for a supplier's component have been fully groomed and the supplier has committed to delivering its component associated with the dependency by a specific date.

The "portfolio backlog" state 510 can be a state during which requirements for a supplier's component have been determined, but before the supplier has begun working on that component. In some examples, the dependency object can remain in the "portfolio backlog" state 510 until a development team from the supplier is able to begin development on the component associated with the dependency.

The "implementing" state 512 can be a state during which the supplier has pulled the component associated with the dependency object for active development, and a supplier development team is actively developing or coding the component. In some examples, the dependency object can remain in the "implementing" state 512 throughout development and unit testing of the supplier component associated with the dependency object.

The "done" state 514 can be a state during which a supplier's development and testing of a component related to the dependency object has completed, and/or the supplier's component has been deployed to a test environment. In some examples, the dependency object can remain in the "done" state 514 until verification can be made by a receiving or consuming entity that the supplier's component is working as intended. For example, the dependency object can remain in the "done" state 514 until the receiving entity that was waiting for the supplier's component determines that the supplier's component has met the acceptance criteria 416 indicated in the dependency object.

The "close" state 516 can be a state at which the receiving entity and the supplying entity are in agreement that the dependency relationship represented by the dependency object has been successfully completed. For example, once the supplying entity delivers a component, the dependency object can be changed to the "done" state 514. If the receiving entity then determines that the delivered component successfully meets the acceptance criteria 416, the dependency object can be changed from the "done" state 514 to the "close" state 514 to mark the dependency relationship as complete.

In some examples or situations, the user interface 106 of the software project management system 100 can allow users to manually edit the state indicator 414 of a dependency object to adjust the state of the dependency object to any of the states shown in FIG. 5, or other states. For instance, the user interface 106 can allow a user to edit the state indicator 414 to change the state of the dependency object from the "done" state 514 to the "close" state 516 when the user determines that corresponding acceptance criteria 416 has been met.

In other examples or situations, the software project management system 100 can be configured to automatically determine the progress or state of other components associated with a dependency relationship, such as epics, features, or stories that other components are dependent upon, and can automatically update the state indicator 414 of a corresponding dependency object based on that determination. As an example, the software project management system 100 can update the state indicator 414 of a dependency object from the "analysis" state 508 to the "portfolio backlog" state 510 once two parties have provided input indicating that they both have agreed to contractual obligations and/or acceptance criteria 416 regarding the dependency. As another example, if a dependency object represents a dependency relationship in which a second feature depends on a first feature, and feature objects 118 tracked by the software project management system 100 indicate that development of the first feature has been tentatively completed but not yet approved, the management tool can be configured to automatically update the state indicator 414 of the associated dependency object to the "done" state 514.

In some examples, the software project management system 100 may use the user interface 106 to prompt a user to review the acceptance criteria 416 for the dependency object upon the dependency object reaching the "done" state 514 automatically or via manual input. In other examples, the software project management system 100 can automatically determine whether acceptance criteria 416 designated in a dependency object has been satisfied, and may update the state indicator 414 of the dependency object appropriately. For instance, if a feature object indicates that a feature has been delivered and approved, but a corresponding dependency object has not yet itself been updated to indicate the acceptance of the feature by a receiving party, the software project management system 100 may be configured to automatically update the corresponding dependency object to change the state indicator 414 to the "close" state 516.

Overall, the use of dependency objects 122 can allow the software project management system 100 to track information about corresponding dependency relationships. The user interface 106 of the software project management system 100 can also display information and reports related to one or more of the dependency objects 122 or corresponding dependency relationships. For example, the user interface 106 can display information about one or more selected dependencies, display lists of dependencies, allow user to search for and/or filter dependencies, display charts, graphs, timelines, or other visual information associated with one or more dependencies, and/or other information about dependency relationships based on the dependency objects 122. In some examples, the information displayed in the user interface 106 can enable a user to view the status of one or more dependencies and/or determine if dependencies are ahead of schedule or behind schedule. Accordingly, the user may be able to address any issues that may be causing a dependency to be behind schedule, and/or plan for scheduling, staffing, and other issues related to development of other components associated with that dependency. FIGS. 6-14 depict non-limiting examples of information that can be displayed in the user interface 106 based on the dependency objects 122.

Figure 6:
FIG. 6 depicts a first example of information that can be displayed in a user interface of the software project management system, in which the information relates to a single dependency.

FIG. 6 depicts a first example 600 of information that can be displayed in the user interface 106, in which the information relates to a single dependency. The user interface 106 can have one or more views, screens, or displays that allow a user to view and/or edit information associated with a particular dependency relationship, based on information stored in a corresponding dependency object. Such information about the particular dependency relationship may be stored in data fields of the corresponding dependency object, such as the data fields shown above in FIG. 4. For example, in FIG. 6 the user interface 106 can display information including a name of a dependency, an identifier of a project associated with the dependency, a portfolio item and path associated with the dependency, owners of the dependency, status and/or progress information associated with dependency, a completion date of the dependency, and other information associated with the dependency. In some examples, the user interface 106 shown in FIG. 6 may allow the user to add or edit information associated with the dependency, such that the user's input modifies the data stored in the corresponding dependency object.

FIG. 7 depicts a second example 700 of information that can be displayed in the user interface 106, in which the information relates to multiple dependencies. In example 700, the user interface 106 may display a list, tree, or other representation multiple dependencies that are represented by multiple dependency objects 122. For example, the view shown in FIG. 7 can allow a user to sort and/or filter a viewable list of dependencies represented by dependency objects 122 by title, identification, owners, progress percentage, creation date, actual completion date, planned completion date, status, and/or other criteria.

Figure 8:
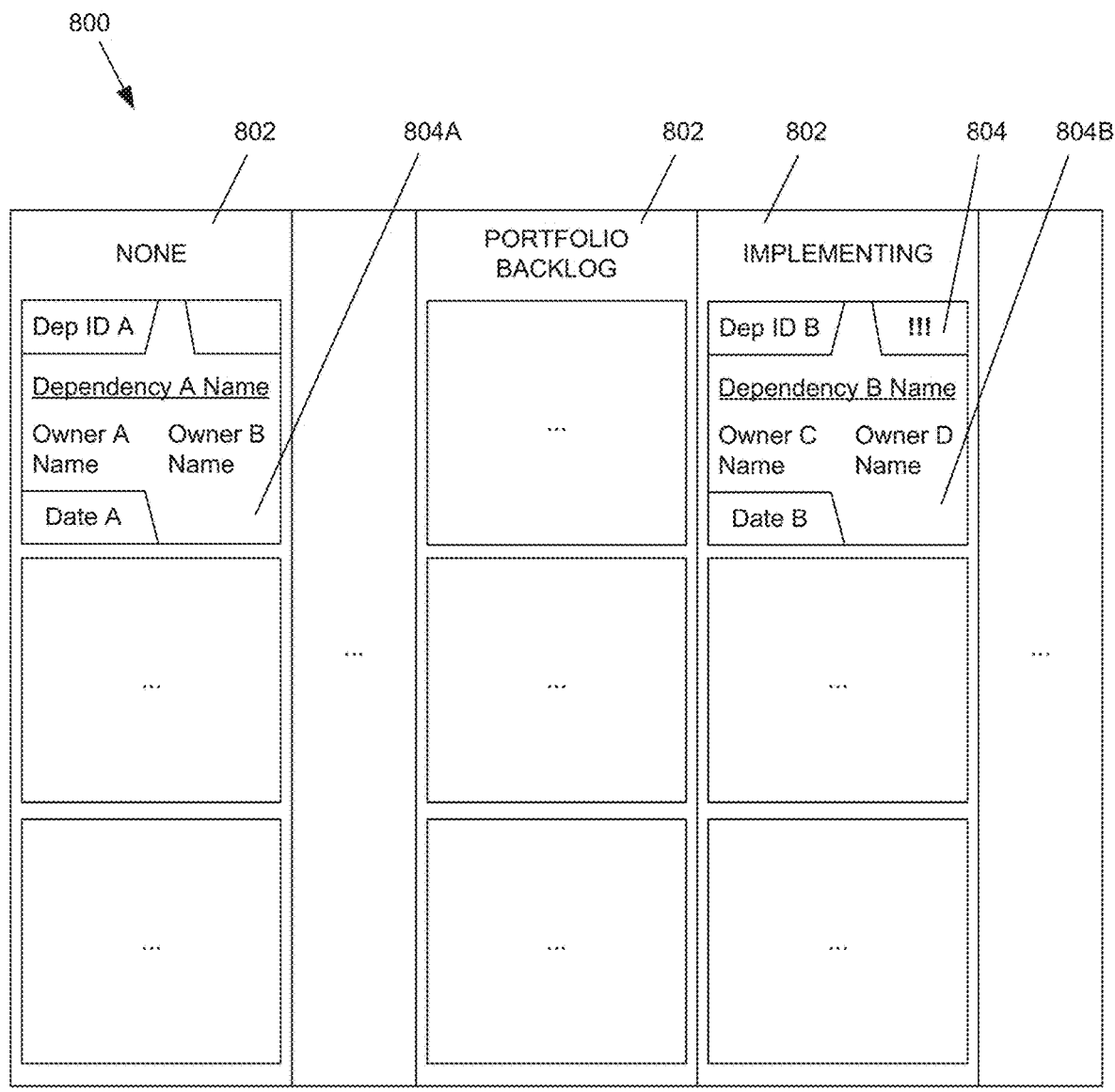
FIG. 8 depicts a third example of information that can be displayed in the user interface, in which the information relates to multiple dependencies sorted based on status.

FIG. 8 depicts a third example 800 of information that can be displayed in the user interface 106, in which the information relates to multiple dependencies sorted based on status. In example 800, visual representations of multiple dependencies can be displayed, based on corresponding dependency objects 122. For example, the user interface 106 can display a Kanban board, or other representation, that displays a series of columns 802 or other groups, with cards, tiles, or other visual representations of dependency objects 122 positioned within corresponding columns 802 or groups. The columns 802 or other groups may each be associated with a different possible value for the state indicators 414 of the dependency objects 122, such as the values shown in FIG. 5. Each column 802 or group can contain cards, tiles, or other representations of dependency objects 122 that have a corresponding state indicator 414. For example, the "none" column on the Kanban board can show cards for dependency objects 122 that have "none" as the value of their state indicator 412, such as card 804A shown in FIG. 8. As another example, the "implementing" column on the Kanban board can show cards for dependency objects 122 that have "implementing" as the value of their state indicator 412, such as card 804B shown in FIG. 8.

Each card, tile, or other visual representation of a dependency object shown in the Kanban board can display information about the corresponding dependency, such as an identifier of the dependency and/or dependency object, owners associated with the dependency, such as receiving and/or supplying owners, a date indicating when the dependency was last updated and/or other dates, and/or any other information. The information shown in a card may be data stored in the data fields for the corresponding dependency object. Accordingly, a user can use the view of example 800 to see an overview of which dependencies have which state indicator 414, and use this view to track the status of multiple dependencies as their state indicators 414 change over time.

In some examples, the view of the user interface 106 shown in FIG. 8 can display a warning indicator 804, such as a warning flag or alert icon on a card, in association with any dependencies that have issues. For instance, if a current date is past an expected completion date associated with a dependency, the user interface can display a warning flag on a card associated with that dependency. As another example, if a vendor or supplier has indicated that they will not be able to hit a future expected delivery date associated with a dependency, a warning indicator 804 can be displayed on a card in the view shown in FIG. 8 to alert a user of that potential issue with the dependency.

In some examples, the view shown in FIG. 8 can allow a user to filter the visual representations shown in the user interface 106 by any type of data stored in the dependency objects 122. For example, the user can enter a product area the user is interested in, and the user interface 106 can switch to displaying only cards associated with dependency objects 122 that match the user-specified product area. Such filtered representations can also be arranged into columns 802 based on their state indicators 414.

Figure 9:
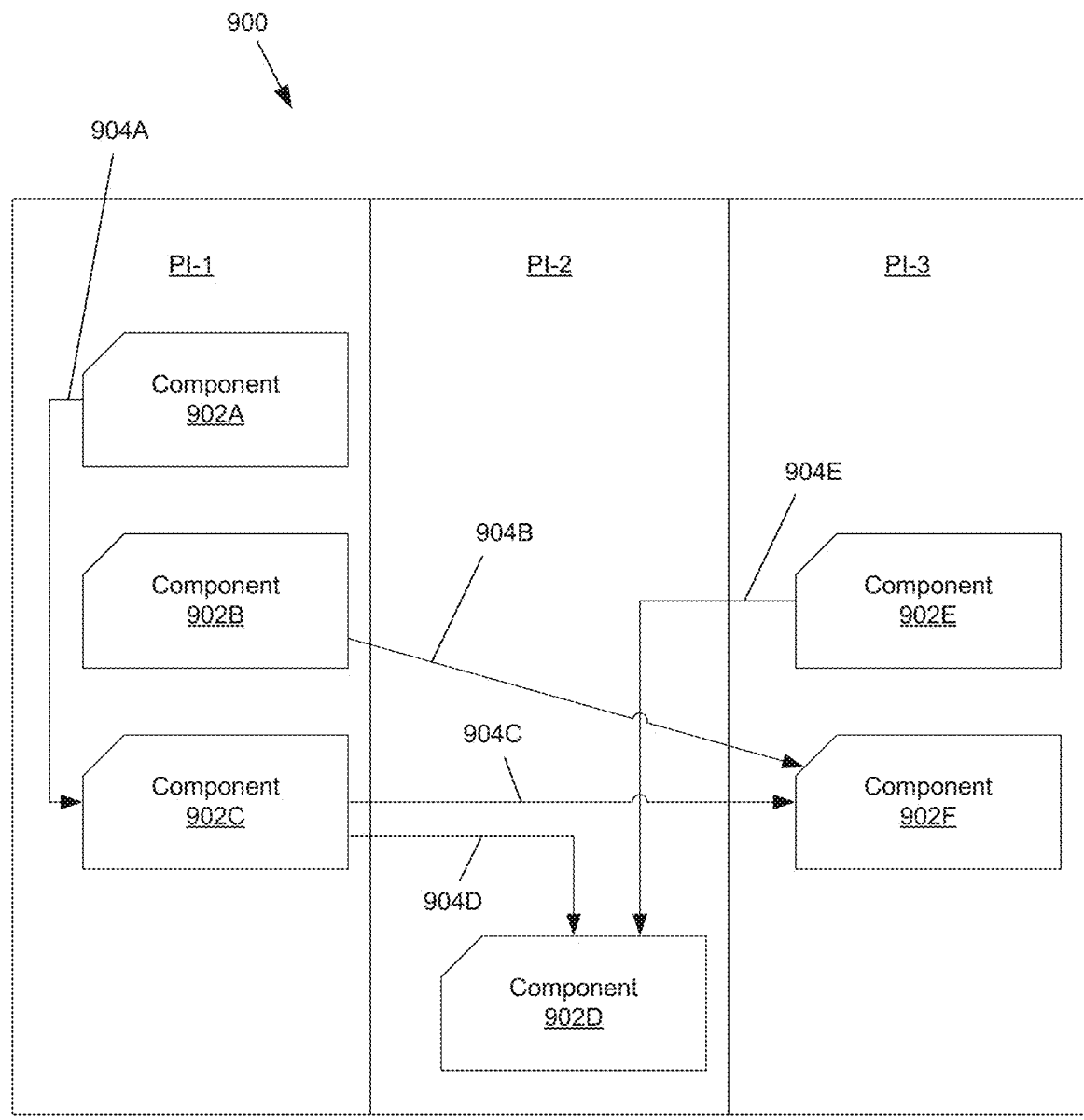
FIG. 9 depicts a fourth example of information that can be displayed in the user interface, in which the information displays dependency relationships associated with different components.

FIG. 9 depicts a fourth example 900 of information that can be displayed in the user interface 106, in which the information displays dependency relationships associated with different components. In example 900, the user interface 106 can display a solution board including representations of components, such as epics, features, and/or stories, grouped by associated PIs. For instance, in FIG. 9, components 902A-902C have been scheduled for development during PI-1, component 902D has been scheduled for development during PI-2, and components 902E and 902F have been scheduled for development during PI-3. The solution board can also represent dependencies 904A between such components using arrows or other visual representations, based on data in corresponding dependency objects. In the view of example 900, a user can determine upstream, downstream, and/or cross-supplier dependency relationships between components schedule for development during the same or different PIs. For instance, in FIG. 9, the user may determine that development of component 902F, scheduled for development during PI-3, depends on development of component 902B and 902C, which are scheduled for earlier development during PI-1. However, the user may also determine that development of component 902D, scheduled for development during PI-2, depends on development of component 902E that is not scheduled until PI-3. Here, the user may determine that development of component 902D should be rescheduled until after PI-3 when development of component 902E is expected to be complete, as component 902D depends on development of component 902E.

Figure 10:
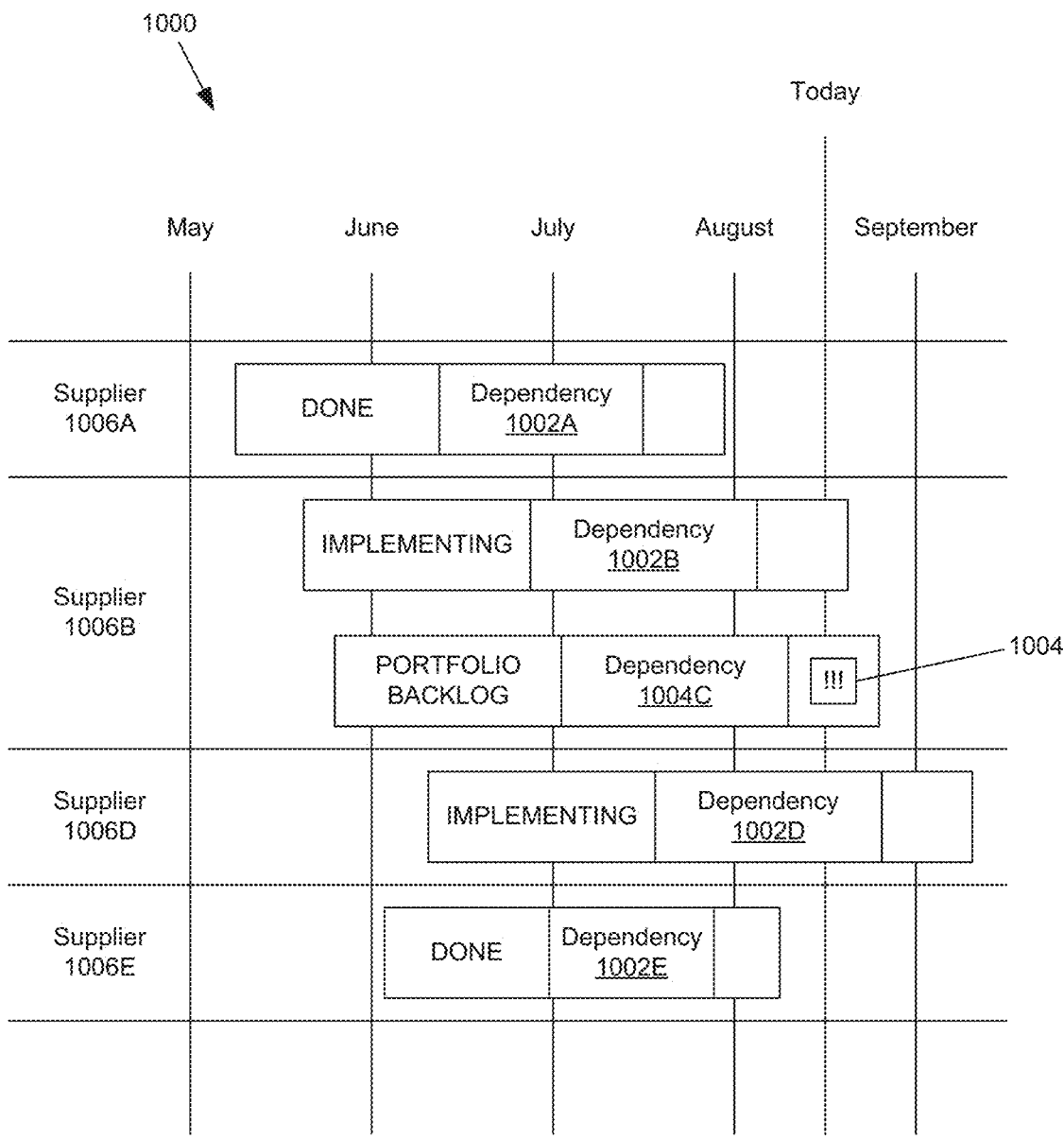
FIG. 10 depicts a fifth example of information that can be displayed in the user interface, in which the user interface displays a dependency roadmap associated with different dependencies.

FIG. 10 depicts a fifth example 1000 of information that can be displayed in the user interface 106, in which the user interface 106 displays a dependency roadmap associated with different dependencies. The dependency roadmap can display dependency information arranged on a timeline, based on dates and other information in corresponding dependency objects 122. The dependency roadmap may display a visual representation of each dependency based on dates 410 in the dependency objects 122, such as creation dates and/or actual completion dates. The representations may also indicate other data from state indicators 414 and/or other fields of the dependency objects 122. In some cases, the representations may also display a warning indicator 1004, similar to the warning indicator 804 discussed above. For example, the representation of dependency 1004C shown in FIG. 10 may include the warning indicator 1004 because it was targeted for completion before the current date, but it has not yet been completed.

In some examples, the dependency roadmap view can group representations of dependencies based on a supplier. For instance, in FIG. 10, a supplier 1006A may have agreed to deliver a component associated with dependency 1002A, while a supplier 1006B may have agreed to deliver components associated with dependencies 1002B and 1002C.

In other examples, the dependency roadmap view can group representations of dependencies based on milestones or other grouping criteria. For example, a group of specific dependencies may be associated with a certain milestone for the overall software development project 102. For instance, when all of the group of dependencies have been completed, a certain component may be ready for beta testing, or another milestone may have been reached. Accordingly, the dependency roadmap view shown in FIG. 10 may alternately display dependencies grouped by milestone, instead of by supplier, so that a user can see the grouped dependencies to determine the status of all the dependencies associated with each milestone.

Figure 11:
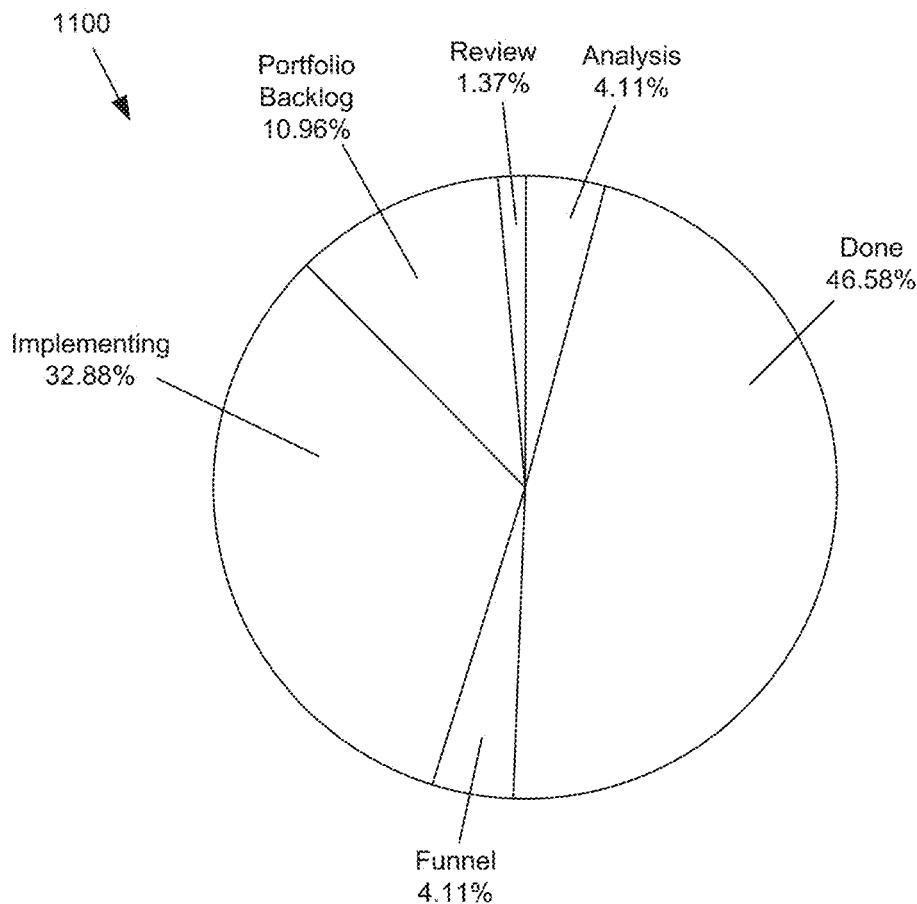
FIG. 11 depicts a sixth example of information that can be displayed in the user interface, in which the user interface displays charts and/or tables associated with different dependencies.

FIG. 11 depicts a sixth example 1100 of information that can be displayed in the user interface 106, in which the user interface 106 displays charts and/or tables associated with different dependencies. In example 1100, the user interface 106 can display a pie chart associated with a set of dependencies, based on percentages of corresponding dependency objects 122 that have common values in their state indicators 414. The user interface 106 may also, or alternatively, display a table or other representation that displays information about the set of dependencies, as shown in FIG. 11. In some examples, the pie chart or other displayed information can be based on state indicators 414 of the set of dependency objects 122 during a designated time period, such as a selected PI or other user-selected time period.

FIG. 12 depicts a seventh example 1200 of information that can be displayed in the user interface 106, in which the user interface 106 displays progress charts associated with one or more time periods. The progress charts can, based on dependency objects 122, indicate a number of dependencies that are work-in-progress (WIP), committed, or done during one or more time periods, such as during past, current, or future time periods. For example, FIG. 12 depicts information associated with dependencies with respect to a current PI and the next PI. "Work-in-progress," "committed," and "done" can correspond with similar state values shown FIG. 5. For example, a dependency can have a "work-in-progress" status while negotiations are underway about the details of the dependency and/or its acceptance criteria. The dependency can move to the "committed" status once an agreement is in place and/or the corresponding dependency object has an "implementing" state indicator 414. The dependency can then have a "committed" status until its dependency object has a "done" state indicator 414, at which point the dependency can move to the "done" status. These types of progress charts can allow a user to determine if dependencies in a current development period have been completed, before the next development period begins.

Figure 13:
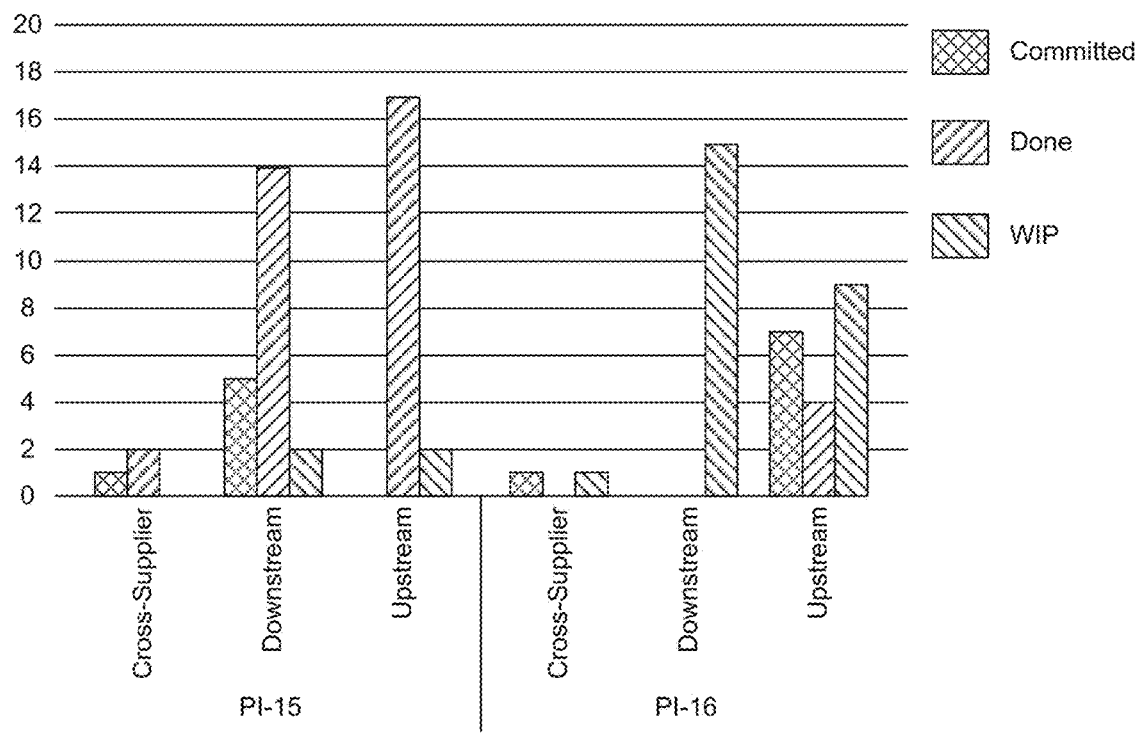
FIG. 13 depicts an eighth example of information that can be displayed in the user interface, in which the user interface displays a dependency flow table and/or chart.

FIG. 13 depicts an eighth example 1300 of information that can be displayed in the user interface 106, in which the user interface 106 displays a dependency flow table and/or chart. The dependency flow table and/or chart can, based on dependency objects 122, indicate counts of upstream, downstream, or cross-supplier dependencies that were in-progress, committed, and/or done during certain time periods.

Figure 14:
FIG. 14 depicts a ninth example of information that can be displayed in the user interface, in which the user interface displays a table of dependency counts by supplier.

FIG. 14 depicts a ninth example 1400 of information that can be displayed in the user interface 106, in which the user interface 106 displays a table of dependency counts by supplier. The table shown in FIG. 14 can indicate total counts of dependencies associated with one or more suppliers, and/or counts of dependencies associated with the suppliers that are in-progress, committed, and/or done.

Although FIGS. 6-14 depicts examples of information that can be displayed in the user interface 106 based on dependency objects 122, the user interface 106 can also display other types of visual representations, reports, tables, lists, and/or other data associated with one or more dependencies. In some examples, the software project management system 100 can also allow users to export dependency information as Excel® files, comma-separated value files, spreadsheets, or similar data formats that express the same or similar data as shown in FIGS. 6-14.

Reports and data associated with one or more dependency objects 122, for example as described above and as shown in the figures above, can allow users to understand the current status and/or progress of one of more dependencies associated with the software development project 102. For example, a manager of a development team can use these types of reports to determine that an outside vendor is running late on one or more components that the manager's team is waiting on. In such a case, the manager may respond by reprioritizing his or her development team's schedule such that work on other components is moved up, and work that depends on the outside vendor's component is moved back. In addition, or alternately, the manager may respond by contacting the outside vendor to ask if anything can be done to deliver the component on schedule. As such, the systems and methods described herein can enable users to better plan and schedule development of components of a software project, based on information about dependency relationships between such components tracked using dependency objects 122.

In some examples, the systems and methods described herein with respect to creating, storing, and/or tracking dependency objects 122 can be an add-on, plug-in, or other enhancement to a software project management system 100, such as VersionOne®, that does not natively use dependency objects 122 to track dependency relationships between components such as epics, features, and/or stories. In other examples, the systems and methods described herein can be built into a software project management system 100 to natively track dependency relationships between components such as epics, features, and/or stories.

Figure 15:
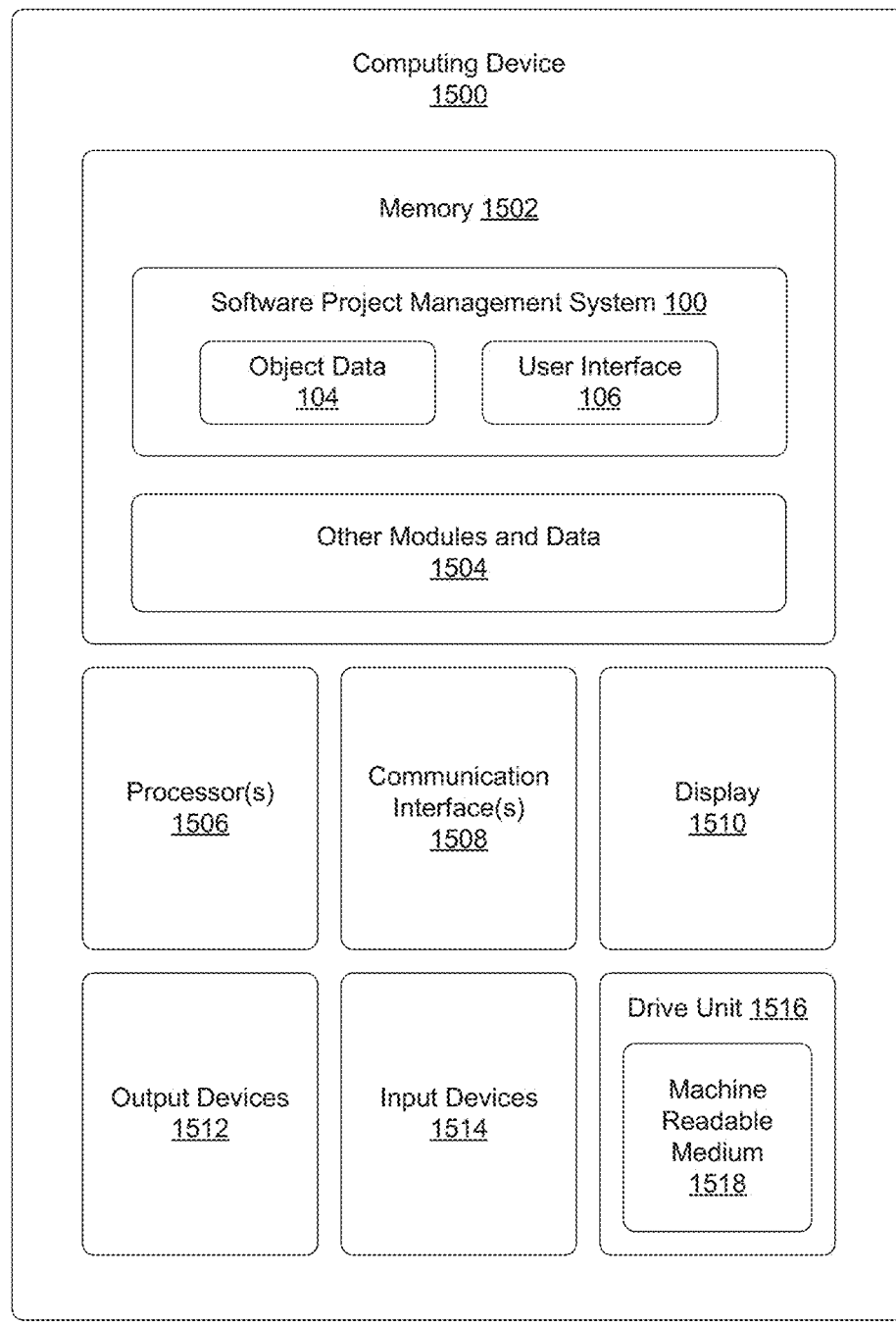
FIG. 15 depicts an example system architecture for a computing device.

FIG. 15 depicts an example system architecture for a computing device 1500 in accordance with various examples. The computing device 1500 can include one or more servers, computers, tablet computers, smartphones, or other computing elements. As shown, a computing device 1500 can have memory 1502 storing object data 104, elements of the user interface 106, and/or other data associated with the software project management system 100 as described herein, and/or other modules and data 1504. As described above, the object data 104 for the software project management system 100 can include dependency objects 122, as well as epic objects 116, feature objects 118, and/or story objects 120.

In some examples, the computing device 1500 can be distributed. For example, the computing device 1500 can include a front-end device, such as a user device that executes the user interface 106 and other front-end portions of the software project management system 100, and a back-end device, such as a server that operates a backend portion of the software project management system 100 to store the object data 104. For instance, a web server can store the object data 104 for dependency objects 122 and other objects, while a user's computer displays the user interface 106 via a web browser or an executable application based on the object data 104 stored at the web server.

The other modules and data 1504 can be utilized by the computing device 1500 to perform or enable performing any action taken by the computing device 1500. The modules and data 1504 can include a platform, operating system, and applications, and/or data utilized by the platform, operating system, and applications.

The computing device 1500 can also have processor(s) 1506, communication interfaces 1508, a display 1510, output devices 1512, input devices 1514, and/or a drive unit 1516 including a machine readable medium 1518.

In various examples, the memory 1502 can include system memory, which may be volatile (such as RAM), non-volatile (such as ROM, flash memory, etc.) or some combination of the two. The memory 1502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the computing device 1500. Any such non-transitory computer-readable media may be part of the computing device 1500.

In various examples, the processor(s) 1506 can be a central processing unit (CPU), a graphics processing unit (GPU), or both CPU and GPU, or any other type of processing unit. Each of the one or more processor(s) 1506 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1506 may also be responsible for executing all computer applications stored in the memory 1502, which can be associated with common types of volatile (RAM) and/or nonvolatile (ROM) memory.

The communication interfaces 1508 can include transceivers, modems, interfaces, antennas, and/or other components that can transmit and/or receive data over networks or other data connections.

The display 1510 can be a liquid crystal display or any other type of display commonly used in computing devices 1500. For example, a display 1510 may be a touch-sensitive display screen, and can then also act as an input device or keypad, such as for providing a soft-key keyboard, navigation buttons, or any other type of input. The output devices 1512 can include any sort of output devices known in the art, such as a display 1510, speakers, a vibrating mechanism, and/or a tactile feedback mechanism. Output devices 1512 can also include ports for one or more peripheral devices, such as headphones, peripheral speakers, and/or a peripheral display. The input devices 1514 can include any sort of input devices known in the art. For example, input devices 1514 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1518 can store one or more sets of instructions, such as software or firmware, that embodies any one or more of the methodologies or functions described herein. The instructions can also reside, completely or at least partially, within the memory 1502, processor(s) 1506, and/or communication interface(s) 1508 during execution thereof by the computing device 1500. The memory 1502 and the processor(s) 1506 also can constitute machine readable media 1518.

Figure 16:
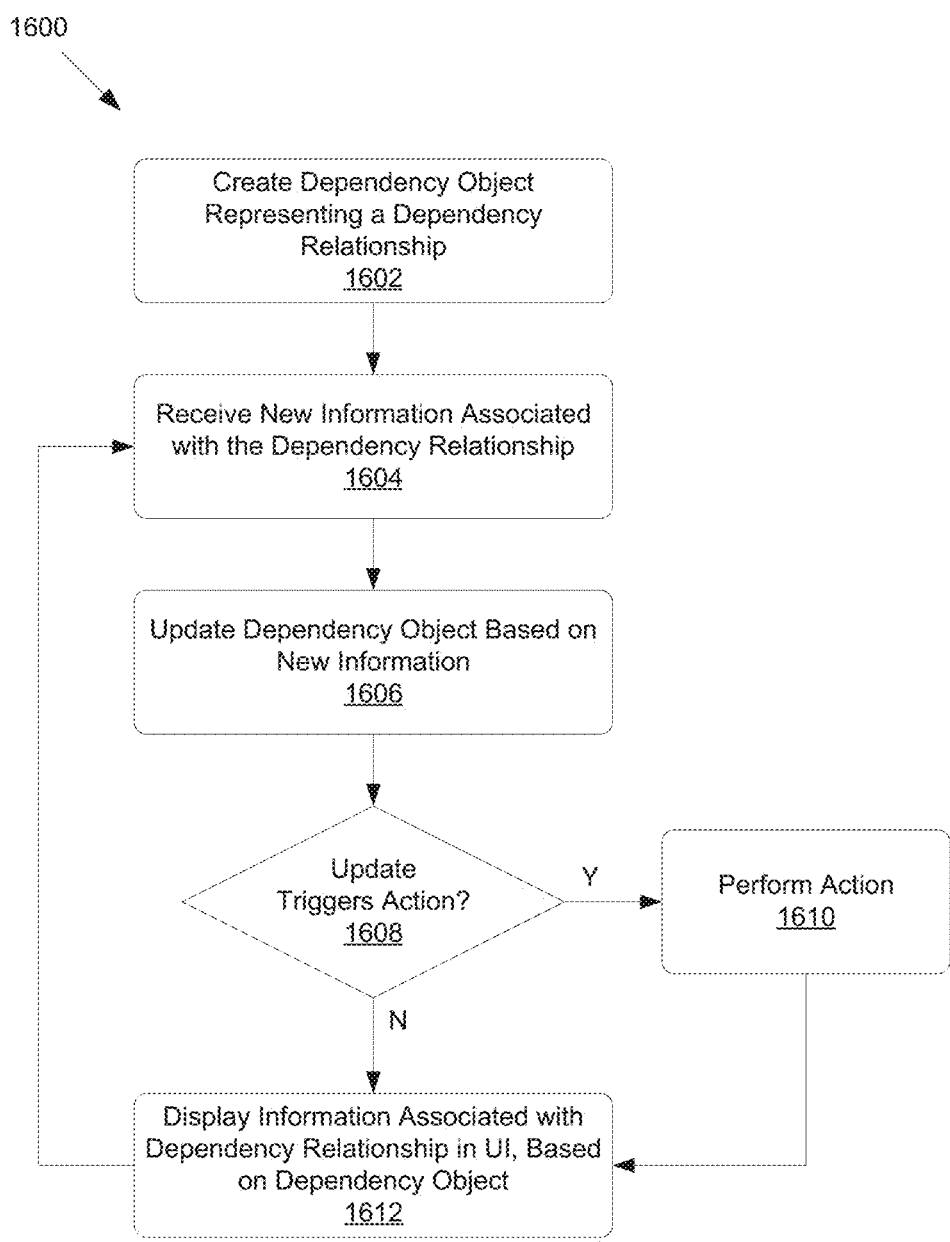
FIG. 16 shows a flowchart of an example method that the software project management system can use to manage dependencies based on dependency objects.

FIG. 16 shows a flowchart of an example method 1600 that the software project management system 100 can use to manage dependencies based on dependency objects. At block 1602, the software project management system 100 can create a dependency object in memory that represents a dependency relationship between two or more components of a software development project and/or other software development projects. For example, the dependency relationship can be between an epic and one or more other epics, an epic and one or more features, an epic and one or more stories, a feature and one or more other features, a feature and one or more stories, a story and one or more stories, a dependency and one or more other dependencies, or any other dependency relationship between two or more components.

The dependency object created at block 1602 can include one or more types of data about the corresponding dependency relationship, such as the data described above with respect to FIG. 4. For example, the dependency object created at block 1602 can include a state indicator that identifies a state of the dependency relationship, and at least two component identifiers that identify components associated with the dependency relationship. As another example, the dependency object created at block 1602 can also include one or more dates associated with the dependency relationship, such as a target completion date for the dependency relationship and/or other dates 410 described above with respect to FIG. 4.

At block 1604, the software project management system 100 can receive new information associated with the dependency relationship represented by the dependency object. For example, the software project management system 100 can receive information from user input, from an automated notification, from data associated with related object data 104, and/or data any other source, that is related to the dependency relationship. As an example, the information received at block 1604 may indicate a change to the state of the dependency relationship, such as a change from the "implementing" state 512 to the "done" state 514. As another example, the information received at block 1604 may indicate that the dependency relationship has changed from an epic-to-epic relationship to an epic-to-feature relationship. As yet another example, the information received at block 1604 may indicate a change to a date 410 associated with the dependency relationship.

At block 1606, the software project management system 100 can update the dependency object in the memory, based on the new information received at block 1608. For example, if the information received at block 1604 indicated a change from the "implementing" state 512 to the "done" state 514, the software project management system 100 can update the state indicator 414 of the dependency object to reflect the "done" state 514.

At block 1608, the software project management system 100 can determine whether the update to the dependency object triggers an action. If the software project management system 100 determines that the update to the dependency object does trigger an action, the software project management system 100 can perform the action at block 1610.

For example, the software project management system 100 can be configured such that an change to the component references 404, to the owner identifiers 408, to one or more dates 410, to the product areas 412, to the state indicator 414, to the acceptance criteria, and/or to any other data in the dependency object is a trigger for an action. In some examples, the action can be an automated action performed by the software project management system 100. For example, the software project management system 100 can be configured to send an automated notification to one or more parties based on a change to the dependency object. In other examples, the action can be a prompt by the software project management system 100 to a user of the software project management system 100 that requests or suggests that the user take a manual action in response to the change to the dependency object. For instance, the software project management system 100 may indicate the change to a user, and request that the user send a manual notification to one or more other parties.

At block 1612, the software project management system 100 can display information associated with the dependency relationship in a user interface, based on the data in the dependency object. For instance, the software project management system 100 can display at least a portion of the data in the dependency object in the user interface, or display other information in the user interface that is derived from the data in the dependency object. In some examples, the software project management system 100 may also display information in the user interface associated with one or more other dependency relationships represented by other dependency objects. Examples of data that can be displayed in the user interface at block 1608 are shown and described with respect to FIGS. 6-14. In some examples, the user interface displayed at block 1612 can relate to an action performed at block 1610. For instance, if an action is performed at block 1610 in response to an update to the dependency object, the action may be to present a notification to a user in the user interface displayed at block 1612.

The software project management system 100 can return to block 1604 to receive new information to further update the dependency object. For example, the software project management system 100 can return to block 1604 to receive new information about the dependency relationship after performing an action at block 1610 and/or after displaying the user interface at block 1612.

The order of the operations shown in FIG. 16 is not intended to be limiting, as the operations may be performed in different orders. For example, in some cases an action can be performed at block 1610 after information is displayed in the user interface at block 1612. As another example, information can be displayed in the user interface at block 1612 prior to receiving the new information at block 1604 or prior to updating the dependency object at block 1606.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising: creating, by a software project management system, and in memory storing object data maintained by the software project management system, a dependency object that represents a dependency relationship between at least two components of a software development project, wherein the object data comprises:
    a plurality of data objects that represents the at least two components associated with the dependency relationship; and
    the dependency object, wherein the dependency object is a distinct data object in the object data, separate from the plurality of data objects in the object data that represents the at least two components associated with the dependency relationship, and the dependency object comprises:
        a state indicator that identifies a state of the dependency relationship; at least two component identifiers that identify the at least two components of the software development project that are associated with the dependency relationship, wherein at a first time, the at least two component identifiers indicate that the dependency relationship is between a first epic and a second epic of the software development project; and
        date information indicating one or more dates associated with the dependency relationship;
    receiving, by the software project management system, new information associated with the dependency relationship indicating that, at a second time, the second epic has been divided into a first feature and a second feature;
    updating, by the software project management system, the dependency object based on the new information by adjusting the at least two component identifiers to indicate that the dependency relationship is between the first epic and at least one of the first feature or the second feature; and
    displaying, by the software project management system, and based on the dependency object, information associated with the dependency relationship in a user interface.

2. The computer-implemented method of claim 1, further comprising: determining, by the software project management system, that the updating the dependency object triggers an action; and performing, by the software project management system, the action based on the updating the dependency object.

3. The computer-implemented method of claim 1, further comprising: receiving, by the software project management system, additional information indicating that the state of the dependency relationship has changed; and updating, by the software project management system, the state indicator of the dependency object based on the additional information.

4. The computer-implemented method of claim 1, further comprising displaying, by the software project management system, and in the user interface, additional information associated with at least one additional dependency relationship based on at least one additional dependency object.

5. The computer-implemented method of claim 4, wherein the user interface arranges the information associated with the dependency relationship and the additional information associated with the at least one additional dependency relationship based on the state indicator of the dependency object and state indicators of the at least one additional dependency object.

6. The computer-implemented method of claim 5, wherein the information and the additional information are displayed in the user interface via a Kanban board.

7. The computer-implemented method of claim 4, wherein the user interface arranges the information associated with the dependency relationship and the additional information associated with the at least one additional dependency relationship based on one or more of: program increments, or a timeline associated with the dependency object and the at least one additional dependency object.

8. The computer-implemented method of claim 1, further comprising: determining, by the software project management system, and based on the date information indicating the one or more dates in the dependency object, that the dependency relationship is behind schedule; and displaying, by the software project management system, and based in the user interface, a warning indicating that the dependency relationship is behind schedule.

9. The computer-implemented method of claim 1, wherein the dependency object further comprises one or more of: a dependency identifier, one or more owner identifiers, one or more product area identifiers, an acceptance criteria, or one or more notes.

10. The computer-implemented method of claim 4, wherein the at least one additional dependency relationship is between two or more of: epics, features, stories, or other dependency relationships associated with the software development project.

11. A computing device, comprising:
    one or more processors;
    memory storing object data and computer-executable instructions associated with a software project management system, wherein the computer-executable instructions, when executed by the one or more processors, cause the computing device to perform operations comprising:
        maintaining, in the object data, a plurality of data objects that represents at least two components of a software development project;
        creating, in the object data, a dependency object that represents a dependency relationship between the at least two components of the software development project, wherein the dependency object is a distinct data object in the object data, separate from the plurality of data objects in the object data that represents the at least two components associated with the dependency relationship, and the dependency object comprises:
- a state indicator that identifies a state of the dependency relationship;
- at least two component identifiers that identify the at least two components of the software development project that are associated with the dependency relationship, wherein at a first time, the at least two component identifiers indicate that the dependency relationship is between a first epic and a second epic of the software development project; and
- date information indicating one or more dates associated with the dependency relationship;

receiving new information associated with the dependency relationship indicating that, at a second time, the second epic has been divided into a first feature and a second feature;

updating the dependency object based on the new information, by adjusting the at least two component identifiers to indicate that the dependency relationship is between the first epic and at least one of the first feature or the second feature; and displaying, in a user interface, and based on the dependency object, information associated with the dependency relationship.

12. The computing device of claim 11, wherein: the dependency object further comprises an indication of an acceptance criteria associated with the dependency relationship, and the operations further comprise: receiving additional information indicating that the acceptance criteria has been met; and changing the state indicator to indicate that the dependency relationship is closed, based on the additional information.

13. The computing device of claim 11, wherein the date information indicates a target completion date, and the operations further comprise: determining that the dependency relationship is behind schedule based on a comparison of a current date against the target completion date; and displaying, in the user interface, a warning indicator indicating that the dependency relationship is behind schedule.

14. The computing device of claim 11, wherein the operations further comprise: determining that the updating the dependency object triggers an action; and performing the action based on the updating the dependency object.

15. The computing device of claim 11, wherein the operations further comprise: receiving additional information indicating that the state of the dependency relationship has changed; and updating the state indicator of the dependency object based on the additional information.

16. One or more non-transitory computer-readable media storing computer-executable instructions associated with a software project management system, wherein the computer-executable instructions that, when executed by one or more processors, cause the one or more processors to perform operations comprising:

maintaining, in object data associated with the software project management system, a plurality of data objects that represents at least two components of a software development project;

creating, in the object data, a dependency object that represents a dependency relationship between the at least two components of the software development project, wherein the dependency object is a distinct data object in the object data, separate from the plurality of data objects in the object data that represents the at least two components associated with the dependency relationship, and the dependency object comprises:
- a state indicator that identifies a state of the dependency relationship;
- at least two component identifiers that identify the at least two components of the software development project that are associated with the dependency relationship, wherein at a first time, the at least two component identifiers indicate that the dependency relationship is between a first epic and a second epic of the software development project; and
- date information indicating one or more dates associated with the dependency relationship;

receiving new information associated with the dependency relationship indicating that at a second time, the second epic has been divided into a first feature and a second feature;

updating the dependency object based on the new information, by adjusting the at least two component identifiers to indicate that the dependency relationship is between the first epic and at least one of the first feature or the second feature; and displaying, in a user interface, and based on the dependency object, information associated with the dependency relationship.

17. The one or more non-transitory computer-readable media of claim 16, wherein the user interface displays representations associated with the dependency object and one or more other dependency objects.

18. The one or more non-transitory computer-readable media of claim 17, wherein the representations are grouped in the user interface based on the state indicator of the dependency object and state indicators of the one or more other dependency objects.

19. The one or more non-transitory computer-readable media of claim 16, wherein the operations further comprise: receiving additional information indicating that the state of the dependency relationship has changed; and updating the state indicator of the dependency object based on the additional information.

20. The one or more non-transitory computer-readable media of claim 17, wherein the one or more other dependency objects represent at least one additional dependency relationship between two or more of epics, features, stories, or other dependency relationships associated with the software development project.

* * * * *